US012632837B2

(12) United States Patent
Cocanougher

(10) Patent No.: US 12,632,837 B2
(45) Date of Patent: May 19, 2026

(54) ANALOGUE TICKET EXCHANGE SYSTEMS AND METHODS

(71) Applicant: Charles Daniel Cocanougher, North Richland Hills, TX (US)

(72) Inventor: Charles Daniel Cocanougher, North Richland Hills, TX (US)

( * ) Notice: Subject to any disclaimer, the term of this patent is extended or adjusted under 35 U.S.C. 154(b) by 0 days.

(21) Appl. No.: 18/578,186

(22) PCT Filed: Apr. 26, 2023

(86) PCT No.: PCT/US2023/019884
§ 371 (c)(1),
(2) Date: Jan. 10, 2024

(87) PCT Pub. No.: WO2023/211991
PCT Pub. Date: Nov. 2, 2023

(65) Prior Publication Data
US 2024/0320567 A1      Sep. 26, 2024

Related U.S. Application Data

(60) Provisional application No. 63/363,575, filed on Apr. 26, 2022.

(51) Int. Cl.
*G06Q 20/04* (2012.01)
*G06Q 10/02* (2012.01)
(Continued)

(52) U.S. Cl.
CPC ......... *G06Q 20/0457* (2013.01); *G06Q 10/02* (2013.01); *G06Q 20/10* (2013.01);
(Continued)

(58) Field of Classification Search
CPC ............... G06Q 20/10; G06Q 20/0457; G06Q 20/4015; G06Q 10/02; G06Q 20/127;
(Continued)

(56) References Cited

U.S. PATENT DOCUMENTS 9,870,585 B2    1/2018  Cronin et al.
10,127,746 B2   11/2018  Bergdale et al.
(Continued)

OTHER PUBLICATIONS

T. Le, Y. Kim and J. -Y. Jo, "Implementation of a Blockchain-Based Event Reselling System," 2019 6th International Conference on Computational Science/Intelligence and Applied Informatics (CSII), Honolulu, HI, USA, 2019, pp. 50-55, doi: 10.1109/CSII.2019.00016. (Year: 2019).*

(Continued)

*Primary Examiner* — George Chen
*Assistant Examiner* — Tayar M Kyu
(74) *Attorney, Agent, or Firm* — Vos-IP, LLC

(57) ABSTRACT

A system for providing frictionless transfer of tickets at a venue comprising: a server system comprising at least one server, a processor, and a database; at least one user device; and at least one unique ticket ID corresponding to a particular seat or ticket; wherein the server performs the following method: accessing the system via the user device and identifying a first ticket corresponding to an event, said first ticket having a unique ticket ID; validating ownership of the first ticket through a confirmation process by validating the unique ticket ID and storing the same within the database; identifying a second ticket for exchange; and confirming the exchange of the first ticket and the second ticket.

17 Claims, 9 Drawing Sheets

(51) Int. Cl.

| | |
|---|---|
| *G06Q 20/10* | (2012.01) |
| *G06Q 20/12* | (2012.01) |
| *G06Q 20/40* | (2012.01) |
| *G06Q 20/42* | (2012.01) |
| *G06Q 30/0251* | (2023.01) |
| *G06Q 30/0283* | (2023.01) |

(52) U.S. Cl.

CPC ....... *G06Q 20/127* (2013.01); *G06Q 20/4014* (2013.01); *G06Q 20/4015* (2020.05); *G06Q 20/42* (2013.01); *G06Q 30/0283* (2013.01); *G06Q 30/0261* (2013.01)

(58) Field of Classification Search

CPC .............. G06Q 20/4014; G06Q 20/42; G06Q 30/0283; G06Q 30/0261; G06Q 10/08; G06Q 20/045; G06Q 30/0609; G06Q 30/0605; G06Q 30/08; G06F 16/955; G06F 21/31; G06F 20/045; H04L 9/0891; H04L 9/50

See application file for complete search history.

(56) References Cited

U.S. PATENT DOCUMENTS

| | | | |
|---|---|---|---|
| 2003/0069827 A1 | 4/2003 | Gathman et al. | |
| 2010/0133339 A1* | 6/2010 | Gibson .............. | G06Q 20/1235 235/382 |
| 2013/0159026 A1* | 6/2013 | Rogel ................... | G06Q 10/02 705/5 |
| 2013/0311214 A1 | 11/2013 | Marti et al. | |
| 2014/0039945 A1 | 2/2014 | Coady et al. | |
| 2014/0278592 A1 | 9/2014 | Giampapa | |
| 2015/0012307 A1 | 1/2015 | Moss | |
| 2015/0199618 A1* | 7/2015 | Khan ................... | H04W 76/14 705/5 |
| 2016/0104041 A1 | 4/2016 | Bowers et al. | |
| 2016/0307379 A1 | 10/2016 | Moore, Jr. et al. | |
| 2016/0335565 A1* | 11/2016 | Charriere .......... | G06Q 30/0605 |
| 2017/0109664 A1* | 4/2017 | Nestor ................. | G06F 21/608 |
| 2017/0330263 A1 | 11/2017 | Shaffer | |
| 2018/0025402 A1 | 1/2018 | Morris | |
| 2019/0066063 A1 | 2/2019 | Jessamine | |
| 2021/0019715 A1 | 1/2021 | Stier et al. | |
| 2022/0172128 A1 | 6/2022 | Lore | |

OTHER PUBLICATIONS

International Search Report issued in International Application No. PCT/US2022/071915 dated Jul. 8, 2022.

International Search Report issued in International Application No. PCT/US2023/019884 dated Jul. 5, 2023.

* cited by examiner

202

226

204

*Unique Offer*

216

214

999/1000

224

16a

Interactive Entertainment

Interactive Entertainment

Interactive Entertainment ment

17a

218 — Ticket Exchange

Verify | Buy

212

Search | Sell

14a

220 — Exchange | Rent

210

208

222

13

Section 501
Row D
Seat 7

15

THE BIG GAME

Figure 4C:
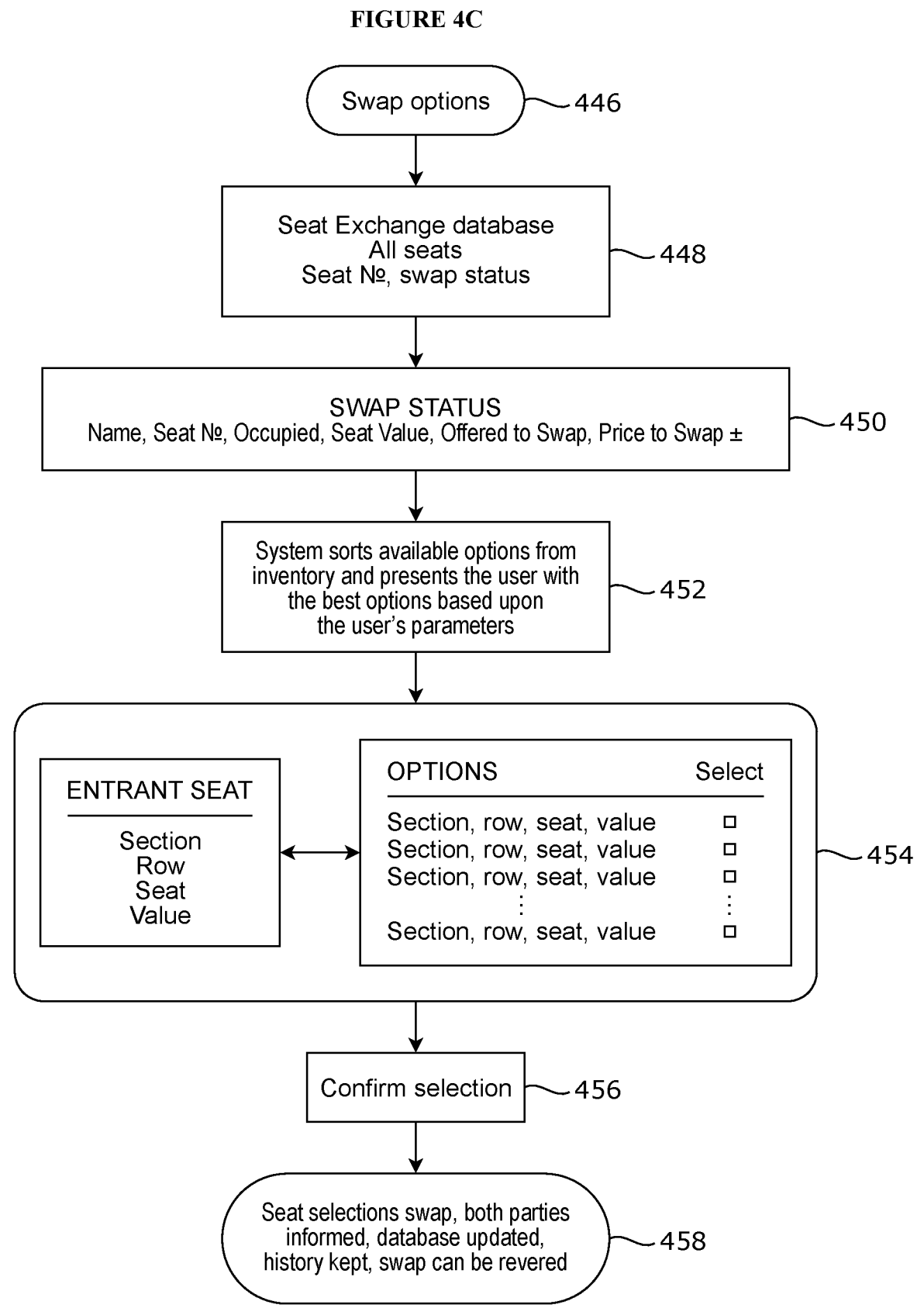

Swap options — 446

Seat Exchange database
All seats
Seat №, swap status — 448

SWAP STATUS
Name, Seat №, Occupied, Seat Value, Offered to Swap, Price to Swap ± — 450

System sorts available options from inventory and presents the user with the best options based upon the user's parameters — 452

ENTRANT SEAT

Section
Row
Seat
Value

OPTIONS                          Select

Section, row, seat, value        □
Section, row, seat, value        □
Section, row, seat, value        □
              ⋮                  ⋮
Section, row, seat, value        □

— 454

Confirm selection — 456

Seat selections swap, both parties informed, database updated, history kept, swap can be revered — 458

ANALOGUE TICKET EXCHANGE SYSTEMS AND METHODS

CROSS-REFERENCE TO RELATED APPLICATIONS

This application is a 371 National Phase Entry of International Patent Application No. PCT/US2023/019884 filed on Apr. 26, 2023, which claims the benefit of U.S. Provisional Patent Application No. 63/363,575 filed on Apr. 26, 2022, with the United States Patent and Trademark Office, the contents of which are incorporated herein by reference in their entirety.

FIELD OF THE INVENTION

The invention is related to the transfer and/or purchase of a ticket that can be exchanged between users while providing for database support and validation of the tickets being exchanged.

BACKGROUND OF THE INVENTION

Venues such as stadiums, arenas and theatres typically utilize a system for assigning a unique identifier to each seat within the venue. For example, the venue may be divided into sections, each section with rows of seats. Venues typically sell tickets for events. In some instances, the tickets are sold for a particular seat. In other instances, the event is general admission and attendees to the event are free to choose whichever seat they would like.

Even when an attendee has selected his/her seat to an event, once at the venue, there are various reasons that attendee may want to move to a different seat in the venue. For example, the view may not be ideal, or the attendee may not appreciate the company of the other attendees in that particular seating section. If the venue seating is general admission, the attendee may simply have arrived too late to select his desired seat and therefore may want to exchange/swap seats with another attendee. Currently, there is no efficient way for an attendee to see if a visually vacant seat is available (i.e., the seat has not been sold vs. the seat has been sold and the ticket holder is simply running late to the event), nor is there a way for the attendee to communicate with other attendees to see if they are interested in exchanging/swapping seats aside from physically communicating with the other attendee who is likely a complete stranger. Applicant has created an elegant solution to address these deficiencies in the current state of the art.

SUMMARY OF THE INVENTION

The preferred embodiments herein are directed to a system and methods for exchanging seats, or more particularly, the right to sit at a seat at a given venue at a given time. The elegant embodiments reduce the friction towards exchanging seats within a venue, specifically where the exchange is for seats of dissimilar value and where it would be appropriate to pay for the disparate value between the seats. However, the embodiments are not so limited, as there may be an exchange of tickets without the exchange of payment between the parties.

In a preferred embodiment, a system for providing frictionless transfer of tickets at a venue comprising: a server system comprising at least one server, a processor, and a database; at least one tag, and at least one user device; accessing the system, by scanning the at least one tag with the at least one user device; identifying at least one ticket to be posted on said system, and before posting said ticket on said system, verifying the ownership of the ticket through a confirmation process; identifying a second ticket for exchange; and confirming the exchange of the at least one ticket and the second ticket.

In a further embodiment, the system further comprising wherein the process of verifying the ownership of the ticket is performed by providing an image of the ticket.

In a further embodiment, the system further comprising wherein the process of verifying the ownership of the ticket is performed by certifying the ownership of the ticket.

In a further embodiment, the system further comprising wherein the at least one ticket has a value different than the second ticket, and wherein a payment is made to offset the difference in value.

In a further embodiment, the system further comprising wherein the exchange of the at least one ticket and the second ticket is provided by transferring the at least one ticket and the second ticket.

In a further preferred embodiment, a method for exchanging tickets at a venue comprising: accessing, via a scan from a user device, a tag corresponding to a seat within a venue; identifying at least one ticket corresponding to said seat, desired for exchange; verifying the ownership of the ticket through a confirmation process; identifying a second ticket for exchange; and confirming the exchange of the at least one ticket and the second ticket.

In a further embodiment, the method further comprising creating a username and login.

In a further embodiment, the method further comprising, the step of verifying the ownership of the ticket, by uploading an image of the ticket to a database. In a further embodiment, the method further comprising, the step of confirming the exchange of the at least one ticket and the second ticket by exchanging the image of the ticket from the database.

In a further preferred embodiment, a method for exchanging seats at a venue comprising: accessing, via a scan from a user device, a tag corresponding to a seat within a venue; identifying at least one ticket corresponding to said seat, desired for exchange; verifying the ownership of the ticket through a confirmation process; identifying a second ticket for exchange; and confirming the exchange of the seat.

In a further embodiment, the method wherein the exchange of the seat does not require the exchange of the ticket.

In a further embodiment, the method wherein the verifying step is a personal verification of the right to be in the seat, or the that the user possesses a ticket for that seat for event.

In a further embodiment, the method further comprising, creating a username and login.

In a further embodiment, the method further comprising the step of verifying the ownership of the ticket, by uploading an image of the ticket to a database.

In a preferred embodiment, a system for providing frictionless transfer of tickets at a venue comprising: (a) a server system comprising at least one server, a processor, and a database; at least one unique ticket ID corresponding to a particular seat or a ticket; and at least one user device; (b) accessing the system via the user device and identifying a first ticket corresponding to an event, said first ticket having a unique ticket ID; (c) validating ownership of the first ticket through a confirmation process by validating the unique ticket ID and storing the same within the database; (d)

identifying a second ticket for exchange; and (e) confirming the exchange of the first ticket and the second ticket.

In a further embodiment, the system wherein the step of identifying a first ticket comprises providing an image of the ticket, providing the unique ticket ID, scanning a machine-readable code comprising the unique ticket ID, or manually inputting ticket information.

In a further embodiment, the system wherein the user device comprises a device ID.

In a further embodiment, the system wherein the process of validating the ownership of the first ticket further comprises a step selected from the group consisting of: providing an image of the ticket, confirming a device ID, confirming an e-mail address, confirming a phone number, confirming a credit card number, providing an image of the seat, scanning the ticket, certifying the ownership of the ticket, providing verification from a user profile, and combinations thereof.

In a further embodiment, the system wherein an image of the ticket is stored within the database and providing an image of the second ticket to the user device upon exchange of the first ticket for the second ticket.

In a further embodiment, the system wherein the first ticket has a value different than the second ticket and wherein a payment is made to offset the difference in value.

In a further embodiment, the system wherein the exchange of the first ticket and the second ticket is provided by transferring the first ticket and the second ticket through the system and providing the unique ticket ID and/or the ticket image to the user device.

In a further embodiment, the system wherein after the exchange, the server updates the database with a new ticket ID for each of the first ticket and the second ticket.

In a further embodiment, the system wherein the database stores a transaction history for the exchange of the first ticket and the second ticket.

In a further embodiment, the system wherein the ticket exchange is confirmed by the scanning of either of the first or second ticket after the ticket exchange.

In a further embodiment, the system wherein a difference in price exists between the first and the second tickets and wherein an exchange of funds is held in escrow until confirmation of the ticket exchange.

In a further embodiment, the system wherein the exchange of the ticket comprises appending a new character to the unique ID to define a new unique ID, which is stored within the database.

In a further embodiment, the system further comprising: wherein the unique ID corresponds to a ticket, wherein the ticket defines a geolocation, and wherein the ticket is verified when a geolocation of the user device matches the geolocation for the ticket; and/or wherein the unique ID is modified by appending at least one additional alphanumeric character to the unique ID after a transaction is completed and storing the new unique ID in the database with a timestamp corresponding to the time of the ticket exchange; and/or wherein an exchanged ticket is provided with a time based access to the ticket; and/or wherein the values of the first and second tickets are dynamically priced; and/or wherein the first and second tickets are valued by auction; and/or wherein the first and second tickets are set at a value by the user; and/or wherein the ticket exchange occurs after scanning one or both of the tickets for entry into a venue.

In a preferred embodiment, a system for exchange of at least two tickets within an app-based system, the system comprising: a graphical user interface (GUI), at least one server, at least one database, and at least one user device; a first ticket and a second ticket, each defined within the system; and a value ascribed to each of the first ticket and the second ticket; the system performing the following method to effectuate the exchange of the at least two tickets: (a) defining a first unique ticket ID to the first ticket and a second unique ticket ID to the second ticket within the database; (b) determining a difference in value between the first ticket and the second ticket; (c) performing a request through the app-based system to request the exchange of the first ticket for the second ticket; (d) receiving an approval of the request to exchange; and (e) exchanging the first ticket for the second ticket.

In a further embodiment, the system wherein step (e) further comprises sending the unique ticket ID for the first and second tickets to a user device connected with the exchange.

In a further embodiment, the system wherein the first unique ticket ID and the second unique ticket ID are populated by scanning the ticket, scanning the unique ticket ID, or manually inputting information into the GUI wherein the server populates the unique ticket ID to the database.

In a further embodiment, the system wherein the request to exchange the first ticket for the second ticket includes a payment of the difference between the value of the first ticket and the defined value of the second ticket.

In a further embodiment, the system wherein the value of the first ticket is the first ticket's face value and the defined value of the second ticket is the second ticket's face value.

In a further embodiment, the system wherein the value of the first ticket is the lesser of the first ticket's face value or a dynamic price and the defined value of the second ticket is the higher of the second ticket's face value or a dynamic price.

In a further embodiment, the system wherein the dynamic price is set by present market conditions. In a further embodiment, the system wherein the dynamic price is based upon a valuation set by a third-party, which is accessed through a third-party API by the system.

In a further embodiment, the system further comprising: wherein the unique ID corresponds to a ticket, wherein the ticket defines a geolocation, and wherein the ticket is verified when the user device geolocation matches the geolocation for the ticket; and/or wherein the unique ID is modified by appending at least one additional alphanumeric character to the unique ID after a transaction is completed and storing the new unique ID in the database with a timestamp corresponding to the time of the ticket exchange; and/or wherein an exchanged ticket is provided with a time-based access to the ticket; and/or wherein the values of the first and second tickets are dynamically priced; and/or wherein the first and second tickets are valued by auction; and/or wherein the first and second tickets are set at a value by the user; and/or wherein the ticket exchange occurs after scanning one or both of the tickets for entry into a venue.

In a preferred embodiment, a system for exchange of a ticket within a ticketing system comprising: a server and a database comprising entries identifying a plurality of tickets; each ticket comprising a value corresponding to a price, a location, and a date; and a unique ticket ID for each ticket; the system performing the following steps to exchange a first ticket for a second ticket: (a) determining a value of a first ticket and a value of a second ticket; (b) determining a first unique ticket ID corresponding to the first ticket and a second unique ticket ID corresponding to the second ticket; (c) identifying a price differential between the first ticket and the second ticket; (d) receiving a request to exchange the first ticket for the second ticket; (e) approving the request to exchange the first ticket for the second ticket wherein approving the request comprises generating a new unique ticket identifier for each of the first ticket and the second ticket; and (f) updating the database to show the new unique ticket identifier within the database wherein the original first and second ticket IDs are no longer valid.

In a further embodiment, the system further comprising: (g) exchanging the first ticket for the second ticket upon payment of the difference in value between the first ticket and the second ticket.

In a preferred embodiment, a method of exchange of a previously purchased ticket for a different value ticket and payment of partial value comprising: (a) identifying a first ticket and a second ticket within an app; (b) defining a first unique ticket identifier for the first ticket and a second unique ticket identifier for the second ticket; (c) determining a value for the first and second tickets wherein the first unique ticket identifier and the second unique ticket identifier include a value of the ticket; (d) calculating a difference in value between the first and the second tickets; (e) receiving a request for the exchange between the first ticket and the second ticket; (f) exchanging the difference in the value between the first ticket and the second ticket from the value defined in the first and second unique ticket identifiers; and (g) exchanging the first ticket for the second ticket upon receipt of the difference in value between the first and second tickets.

In a preferred embodiment, a method of providing a partial, time-based exchange of a ticket during an event comprising: (a) defining a first location for a first ticket and a first time-based access for use of the first ticket; (b) defining a second location for a second ticket and a second time-based access for use of the second ticket; (c) requesting an exchange of the first ticket for the second ticket by a first user device for a given duration during the first or second time-based access; and (d) providing a copy of the second ticket to the first user device during the second time-based access wherein the copy of the second ticket is only valid during the second time-based access.

In a preferred embodiment, a method for providing for exchange of tickets within a geolocation at a given time comprising: (a) providing access to a first ticket and at least a second ticket by a user device via an app; (b) performing a geolocation search for an event corresponding to a location the user device; (c) determining whether the geolocation of the user device corresponds to a known location of the event corresponding to said first ticket and said second ticket; (d) updating the tickets to an exchange platform within the app after the first and second tickets have matched within the same geolocation as the event and the user device; (e) receiving a request for the exchange of the first ticket and the at least second ticket; and (f) exchanging the first ticket with the at least second ticket by providing a visual or radio code corresponding to the at least first or second ticket to the user device.

In a further embodiment, the method wherein the exchange of the first ticket for the second ticket is performed by accessing a database storing the visual or radio code through a server and modifying the code to a new code, which is transmitted to the user device.

In a further embodiment, the method wherein the exchange of the first ticket for the second ticket is performed by appending a subsequent element onto the visual or radio code, said subsequent element modifying the original visual or radio code with the subsequent element to define that the ticket has been exchanged, and wherein the first visual or radio code without the subsequent element is no longer valid.

In a preferred embodiment, an anonymous ticket exchange via an app-based system comprising: (a) an app-based exchange platform for exchange of a first ticket for a second ticket; (b) a user profile corresponding to a first ticket and a second user profile corresponding to said second ticket; (c) a rating system defining a rating for each of the first user profile and the second user profile; (d) receiving a request for an exchange between the first ticket and the second ticket within the app, each of said first and said second tickets comprising data relating to the rating of the first and second user profiles; and (e) performing an exchange of the first ticket for the second ticket, said exchange comprising a digital exchange of the first and second tickets, wherein the exchange of tickets is performed within the app.

In a further embodiment, the system further comprising holding the exchange of funds provided by the exchange of the first and second ticket within escrow upon the exchange of the first and second tickets and receiving a confirmation of validity of the ticket within the app after a scan of either of the first or second ticket and releasing the funds from escrow.

In a further embodiment, the system or method wherein upon exchange of tickets, a scannable code attached to the exchanged ticket is scannable, either as if it were the original ticket or as if it were a new ticket.

In a further embodiment, the system or method wherein a fee is charged by the venue or ticket provider for each exchange.

In a further embodiment, the system or method wherein upon exchange of seats, a fee is charged by the venue or the ticket provider for transfer of the ticket from a first user to a second user.

In a further embodiment, the system or method wherein when new data as appended to the unique ticket ID, a fee is charged by the venue or ticket provider, which confirms the entry of the new ticket into the database.

In a further embodiment, the system or method wherein the pricing of any ticket is based on dynamic pricing.

In a further embodiment, the system or method wherein the ticket for a first seat or a second seat is modified to a defined price set by a user or a defined price set by a third-party platform, which defines a present market price for the ticket.

In a further embodiment, the system or method wherein the exchange of seats is provided only after the start of an event at a venue, wherein ticket sales for the event are locked or closed.

In a further embodiment, the system or method wherein a user defines a first ticket corresponding to a seat owned by the user and wherein the second ticket corresponding to a second seat is not occupied.

In a further embodiment, the system or method wherein the second ticket corresponds to a second seat which is not occupied but was previously purchased; wherein a user provides a request to occupy the second seat; and wherein an API call identifies the owner of the second seat and delivers to the owner a request to swap or sell the seat.

In a further embodiment, the system or method wherein each unsold ticket and each ticket offered for trade are provided in an auction; wherein each bidder bids on one or more tickets; and wherein a user who wins an auction and who owned a previously owned seat places the previously owned seat back into the auction and wherein the user receives a portion of the sale of the user's previously owned seat if and when it sells.

In a preferred embodiment, a system for exchange of at least two tickets within an app-based system, the system comprising: a graphical user interface (GUI), at least one server, at least one database, and at least one user device; a first ticket and a second ticket, each defined within the system; and a value ascribed to each of the first ticket and the second ticket; the system performing the following method to effectuate the exchange of the at least two tickets: (a) receiving a request from the server to input a first unique ticket ID to the first ticket and a second unique ticket ID to the second ticket within the database; updating the database with the first and second unique ticket IDs with a timestamp corresponding to the time of receipt; (c) requesting a price for each of the first ticket and the second ticket from the server; (d) determining a difference in value between the first ticket and the second ticket; (e) performing a request through the app-based system to request the exchange of the first ticket for the second ticket and defining in the request the difference in price between the value of the first ticket and the second ticket; (f) receiving an approval of the request to exchange; (g) providing a transfer of value based on the difference in the price between the first ticket and the second ticket and updating the same within the database; and (h) exchanging the first ticket for the second ticket.

In a further embodiment, the system further comprising optionally modifying the unique ticket ID within the database to a new unique ticket ID.

In a further embodiment, the system further comprising wherein the exchange of the first ticket for the second ticket comprises providing the new ticket comprising the new unique ticket ID to the user device.

BRIEF DESCRIPTION OF THE FIGURES

FIGS. 4A, 4B, and 4C are a flowchart of an embodiment of the system.

DETAILED DESCRIPTION OF THE INVENTION

Figure 1:
FIG. 1 depicts a stadium comprising a plurality of seats, rows and sections, and a user device that is accessing a user portal including an option for exchanging/upgrading seats.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

EVENT: Nonlimiting examples of an event include a professional, amateur or intermural sporting events (i.e., football, baseball, hockey, basketball, soccer, rugby or cricket game, tennis or golf match, track and field or figure skating event or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

MACHINE READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as T-shirts, sweatshirts, hats, mugs, glasses, posters, CDs, and the like, (iv) a piece of paper, cardstock, or plastic that is handed to users, such as a ticket, (v) a video stream viewed over the Internet or network television channel, and/or (vi) an LCD/LED/e ink display device embedded, attached or affixed to a surface.

PROPRIETOR: Any person or entity who purchases, subscribes to, or otherwise uses the system and/or platform and who is not a user. A Proprietor may or may not have administrative privileges to the system. Nonlimiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, Internet broadcasts), hospitals and health care systems, ticketing platforms, airlines, ride share services, etc.

TICKET: Anything that gives the holder a certain right, typically to enter a venue or attend an event. Tickets can be printed on paper, plastic, or any other type of material. Tickets can also be provided as PDFs, JPEGs, or any other type of image file. Tickets can also be NFC technology that is stored on a user device or any other type of contactless technology. Tickets can also be any type of unique code. Tickets need not be physical and can instead be totally virtually represented by the name or likeliness of the individual, a personal ID such as but not limited to a fingerprint or retina scan, or government issued ID as long as that representation is also associated with the venue's event time, place, and location if the event is using general admission seating rather than assigned seating.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle or high school) or a college campus or dorm.

Embodiments herein are directed towards systems and methods for providing ticket sales and exchanges. The system is employed via an Application (App), which is customarily downloadable onto a user device, such as a smart phone, or can be accessed from a Web page. When accessing from the App, the App itself provides numerous ways to engage with a ticket and the user so as to verify or validate the user or a ticket/seat, and to provide access to the platform for ticket exchange. The same can be found when accessing from a Web page. These options are explored in more detail in the following embodiments and explanations thereto.

FIG. 1 shows an exemplary venue (202), which is a football stadium including a jumbo screen (204), seats (208), and a plurality of tags such as tag (16a). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system. Likewise, an event may be any event including sporting events, artistic performances, trade shows, conferences, ceremonies, services, self-guided tours (e.g., at museums, historic sites), and zoos as a few nonlimiting examples. Notably, museums, historic sites, zoos, and similar examples may be both the venue and the event or house the event.

In the example of FIG. 1, each seat (208) has a seatback (210) with a tag (e.g., [16a]) disposed thereon. In this way, event users can easily see a tag (e.g., [16a]) directly in front of them while they are sitting in their seats (208). Thus, the tag (e.g., [16a]) that the event user sees is associated with the seat (208) in which the user is sitting. Tag association with a particular seat (208) is desirable in embodiments that take advantage of knowing the event user's seat location or for confirming or validating seats for access to the exchange system. In-venue tags (e.g., [16a]), however, are not limited to being positioned on seatbacks (210); they may be placed in a wide variety of locations within a venue (202). For example, if in-venue tags (16a) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16a) may be associated with other locations/points of interest, and thus may be placed at or near the locations/points of interest such as entrances, levels, sections, isles, loge seats, individual people (e.g., with a tagged badge, tagged ticket, or the like), restrooms, various additional possibilities, or combinations thereof. Therefore, while one example of in-venue tag (16a) placement is illustrated in FIG. 1, in-venue tag (16a) placement should be broadly construed to include any placement suitable for use as described herein. Tags (16a) may be associated with one or more groupings, for example, by a section, (222, 224, or 226), wherein grouping of tags (16a) may provide certain benefits in the various embodiments detailed herein. Alternative placement schemes that may be devised by one skilled in the art, consistent with the teachings of the present invention, should be considered within the scope of the present disclosure. The tag may also simply state the seat number and relevant information in purely analog form.

Machine readable codes ("MRC"), such as QR codes have gained popularity and users have come to recognize that a MRC can be scanned by a device (14a) such as a smart phone which will provide the user with additional information or content. Generally, each user device may be used to scan, read, or otherwise detect (collectively "scan") the MRC to gather information related to the MRC associated with a respective tag (16a). The user device (14a) may optionally have a camera (212) that is used to scan the MRC (17a) on the tag (16a), or otherwise take an image of the analog characters on the tag (16a). In some embodiments, the act of scanning a MRC initiates communications between the user device that scanned the MRC and the platform, which may result in the data associated with the MRC to be populated into the App that displays a GUI such as the one shown in (218), or, can also result in the rendering of a Web page or the like (e.g., related to the event) by a Web browser and/or other application running on the user device. Communications between user devices and platform is typically via one or more networks, which may include, without limitation, the Internet, mobile networks, cloud-based platforms, or combinations thereof. The GUI (218) launched by the App contains one or more buttons (220) which allow the user to navigate, interact with, control and make selection within the App. Nonlimiting examples of the functions controlled by the buttons (220) include verifying seat and/or ticket, buy seat and/or ticket, search inventory, sell, exchange or rent your seat and/or ticket.

Seats at an event remain vacant for a variety of reasons before or after the event has started. The venue itself often has more tickets available, and sometimes the most desirable tickets are left unsold due to the higher price for those seats. Often, the attendees who bought the most desirable seats, never sell them, but keep them available for themselves or their friends, with the possible intention of using the seats (i.e., season ticket holders with seats behind home plate for a baseball game), and therefore, the venue does not know with 100% certainty that the seats will not be in use until right before the start of the event or at the time of the event starting, or even one quarter or half way through the event. Additionally, third-party ticket resale software systems are not designed to handle ticket resales inside the event or after the event has started. Thus, such seats may go unused, even when they are highly desirable seats.

EMBODIMENT #1: An attendee is in a venue, for example, a theatre, and desires to change seats within the venue. The attendee, utilizes the ticketing system (300) of the present embodiments and accesses the system by going directly to the application (App) or through a Web browser. The attendee can log into the system, which may have information about the attendee regarding his user profile. For example, a user profile may list the prior transactions of the user, a rating system for the user, and other information that the user chooses to display. The system collects a vast amount of data including user data, transaction data, and event data that can be aggregated and analyzed to track trends.

Once on the system, a menu of choices is presented, such as in the example GUI (218) of FIG. 1. The user desires to move seats and thus needs to provide some information to the system about the current seat of the user. Using the system (300), the user can identify the given seat, e.g., by scanning the MRC (17a) on the seat with the camera (212) on the user device. Alternatively, the user could scan the unique ticket code (15) on their ticket (11), or as addressed in other embodiments, the user profile itself may be sufficient for verification. The ticket (11) may optionally include location identifying information (13) such as the section, row and seat number for which the ticket (11) is valid, and which should also correspond to the seat, such as on the tag (16a). The user, having verified and defined a seat to the system, can now exchange seats with a second user, who has also verified and defined their seat. The first user and second user agree to a swap of the seats and the transaction is complete. In this case, the system holds the original tickets for each user. Thus, should either the first or second user need to show the ticket for their new seat, the system will hold and identify the exchanged tickets, which can optionally be provided to each user. Thus, each of the first user and the second user can swap seats and have supporting information that the original person owned that seat, and thus they can now occupy that seat because of the agreed upon exchange.

In a further embodiment, the attendee/user provides information to the system to identify and validate a first ticket, to be exchanged for a second ticket. This can be performed by interacting with a Web browser, Web app, progressive Web app, such as GUI (218) or any other mechanism that allows the user device to communicate with the system. One or both of the first ticket and the user need to validate into the system (300). The validation into the system may be performed by multiple ways, including but not limited to, a user profile being validated, a scanning of a ticket, entry of information regarding a ticket, scanning a MRC within the venue or on the ticket, entering personal information that is connected to the ticket. Further examples may include but are not limited to: linking of the user profile to an email, a credit card, bank, or other personal information used to purchase the ticket, wherein a third-party API call to one of these, confirms the ownership of the ticket. An image of the seat with the ticket, corresponding to the same seat can be utilized. Furthermore, the system can automatically verify the seat, though certain interactions with an MRC on a ticket, on a seat, personally identifiable information, or within the user device itself.

In a further embodiment, AI is utilized to compare two images. A first image is taken by the first user of the seat. The second user then takes a second image, of the same seat, once the second user is at the seat. AI compares the two images to confirm that the first and second images are of the same seat on the same day, thereby authorizing the exchange.

By providing this information, the system (300) can validate the ticket (11) (i.e., the system determines that the ticket is real) and thus, the ticket has value for exchange. Thus, in this case, the user scans the MRC (17a) to provide this information into the user's profile within the system and this provides the system the ability to track and manage the ticket as well as contact and/or interact with him. Validation may require one, or two or more steps to validate a ticket.

As one embodiment of the system (300), instead of performing any scan, the attendee certifies or verifies that the seat in which he is sitting is in fact his and therefore he can exchange, swap or trade or sell the seat. The verification can be evidenced by personal information, the ticket itself, scans of the ticket or seat, or simply by the user.

The user can now select another seat that is desired and exchange the first seat that belongs to the user, with a second seat, belonging to another. The second seat may be unsold or may belong to a second user. As the embodiments detail below, certain features may allow for exchange of the seats of the same or different value and possible modifications to the ticket, either within the system, or even within the original ticketing system. Here, a simple exchange of one seat for another, without the exchange of funds, is completed and the user and the second user exchange seats.

Because the attendee has verified the seat/ticket or verified himself within the system, the system is capable of contacting him, after the exchange/swap, if an usher/venue employee needs to verify the new seat, or the new attendee sitting in the seat, then the system just points back to the original person and then notifies the original person to verify the seat was his, or the system itself provides the verification. This is essentially an honor system, that is then verified within the system, so that if a user needs to show the seat they are entitled to, they can access the App and pull up a ticket or other information that shows the user's lawful possession of the given seat/ticket for the particular event. Thus, by storing certain data on the system, such as the ticket or ticketing information relevant to each ticket, the system enhances the safety and validity of ticket exchange.

The system can keep track of the level of responsibly of attendees (i.e., attendees who truthfully verify most or all of the time vs. attendees who fraudulently claim that they are entitled to a seat). By doing this, the system establishes a rapport with users and can assign users a ranking (i.e., Verified Gold Patron) in order to give users a level of comfort that the transaction is legitimate and therefore that user may be more desired as a target for exchanging/ swapping seats. One application of this embodiment is for season ticket holders and major event goers to be able to quickly have their seats available for swap, whenever they want. Likewise, the system is able to detect and flag a fraudulent transaction. In the event that the system detects fraud, it immediately stops the current transaction, prevents the nefarious party from engaging in a further transactions, and takes the counterfeit seats out of circulation and creates real time solutions either via an employee or administrator or via AI or machine learning. An advantage to having the system rectify a fraudulent transaction is that it prevents confrontation and other unpleasantries that occur when users attempt to correct a situation between themselves. Repeat offenders who are found disingenuous will be flagged and potentially blacklisted from further usage of the system.

Accordingly, it may be desirable for a user to create an account, including a username and login, which will allow the user to track his or her tickets as well as to verify his positive transactions to create verifiable and trustworthy ratings. Generally, user ratings are helpful for individuals to confirm that the transaction they are desiring will resolve as expected, with both parties obtaining the actual seats they want, without risk that one of the parties does not own the seats or does not have the right to change seats, for whatever reason.

EMBODIMENT #2: Once a user has accessed the system, via an App or a Web site, a preferred first step is to verify or validate the seat, which can be accomplished in a variety of ways. If the venue utilizes uniquely coded MRCs corresponding to the individual ticket or the seat, a simple scan of the MRC may be sufficient to validate a seat. For example, the MRC will identify the seat, section, the time and date, and thus can identify the event at the moment. The system can then verify, via a server and database system, whether the user possesses the ticket corresponding to the given scanned seat. This can be identified by personal information on the user device, an API call to a third-party database, or another electronic means. Alternatively, the user can provide evidence of the ticket, whether in an electronic form, or paper form, by uploading the ticket to the system, wherein the system validates the ticket. Alternatively, if uniquely coded MRCs are not available, the attendee can simply enter his seat number into a GUI generated by the system. In yet another alternative, the attendee can scan his ticket code to verify the seat. Tickets can also be held on paper or electronically by the venue, where the record of the attendees includes personally identifiable information such as their name, email, credit card. When the attendees arrive, they present such information, for example tickets to higher priced functions and events may be held at a box office, check-in table, or will call, and the ticket is given to the attendee. This information is then stored within a database and optionally with a time stamp and a geolocation of the user device that created the data entry.

The system is designed in such a way that it does not require that the event be known in order to function, nor does it need to know the information for the original ticket sold (i.e., the unique ticket code [15]). In the simplest embodiments, the attendee simply enters the system, verifies their current seat location, indicates that they are interested in exchanging or swapping seats, and uses the system to look for other attendees in the venue who have also indicated that they are interested in the same. In a nonlimiting embodiment, the system allows a seat to be exchanged/swapped based only on the MRC on each seat or ticket. In this instance, the attendee scans the MRC, and the attendee clicks a button verifying they hold and own that seat at the current time (and may be also designate for the next one or two or three hours). The system also has the option to allow attendees to upload a copy of their ticket to the record associated with the exchange/swap (i.e., take a picture or screen shot of the ticket via the user device and upload it to the system). Alternatively, or in addition, the user's personal information, or data stored on the user device, or information associated with a phone number, a credit card, mobile pay, or other such information, can be utilized to verify the purchase and/or ownership of the ticket, to allow the ticket to be verified.

In other examples of this embodiment, the system uses geolocation to verify the attendee's location at the event. Nonlimiting examples of geolocation include placing a geofence around the parameter of the venue, accessing the GPS location of the user's device, utilizing blue tooth low energy (BLE) in the form of beacons or gateways, and utilizing WiFi positioning by tapping into wireless local area networks (WLANs). Geolocation can be paired with time stamp information for greater accuracy as to which event is occurring at the venue at a particular time. In some instances, geolocation may be accurate enough to pinpoint the exact seat in which a user device is located.

While geolocation may be used in some embodiments for a verification step, in other embodiments, geolocation is required of each user to make the exchange. Thus, in order for two users to perform a ticket or seat exchange using geolocation, the users access the system via an App or Web page and give the system access to their ticket location. The system uses geolocation to verify that the location of the user device corresponds to certain parameters. This could be that the user device is located within the venue associated with the event or it can be more specific and located that the user devices is in the exact seat associated with the ticket. This parameter is set by an administrator such as the venue owner, event promoter, ticket agency or team. Once the geolocation verification is performed and meets the parameters set by the administrator, the system updates the database to indicate that both users' tickets have matched the geolocation for the event. The system then receives a request to exchange the first ticket with the second ticket. Once the exchange is complete, the system provides a visual or radio code to the user devices for the newly exchanged locations of the tickets. The exchange of the first and second ticket or seat can be performed by accessing a database that stores the visual or radio codes, via a server, and modifying the existing code associated with a particular ticket or seat to a new code which is transmitted to the user's device. Alternatively, rather than changing the codes, the system can append the visual or radio codes with a subsequent element to define that the ticket has been exchanged thereby creating a chain of title record for the seat or ticket. In certain embodiments, all previous codes in the chain of title without the subsequent element appended are no longer valid.

Accordingly, geolocation can be used as a mechanism to validate or verify the ticket within the system. This is important for certain embodiments, wherein two tickets are being swapped, and each of the users is already in the venue. Thus, the users are both past the entry gates, and each of the tickets has already been "used" for entry. This extra step aids in seamlessly verifying the ticket, the location of the user having the ticket, and providing for a seamless mechanism to exchange tickets between users.

To the extent that the system requires personally identifiable information from the attendee, the system can obtain that information directly from the attendee to the extent the system does not already have the information, by communicating to the user device through calling, texting, and or emailing, or any other means of communication. Thus, if the ticket is only stored under the personal information of one user, then that information would be needed if ticket information is needed to allow one user to move to a given seat within the venue.

The system also provides a mechanism for attendees who may have lost their original ticket to participate in the system. Frequently, attendees misplace or forget to bring tickets to a venue. In these instances, the venue is able to reissue tickets or allow the attendee access to the venue based upon cross referencing the attendees name, a credit card, a phone number, mobile pay, or other information corresponding to the ticket, against a database. This type of verification can be used in the system to confirm an attendee's right to a ticket for entry and thus would also be the type of information desirable for verification of a particular seat for exchange/swap.

Figure 2A:
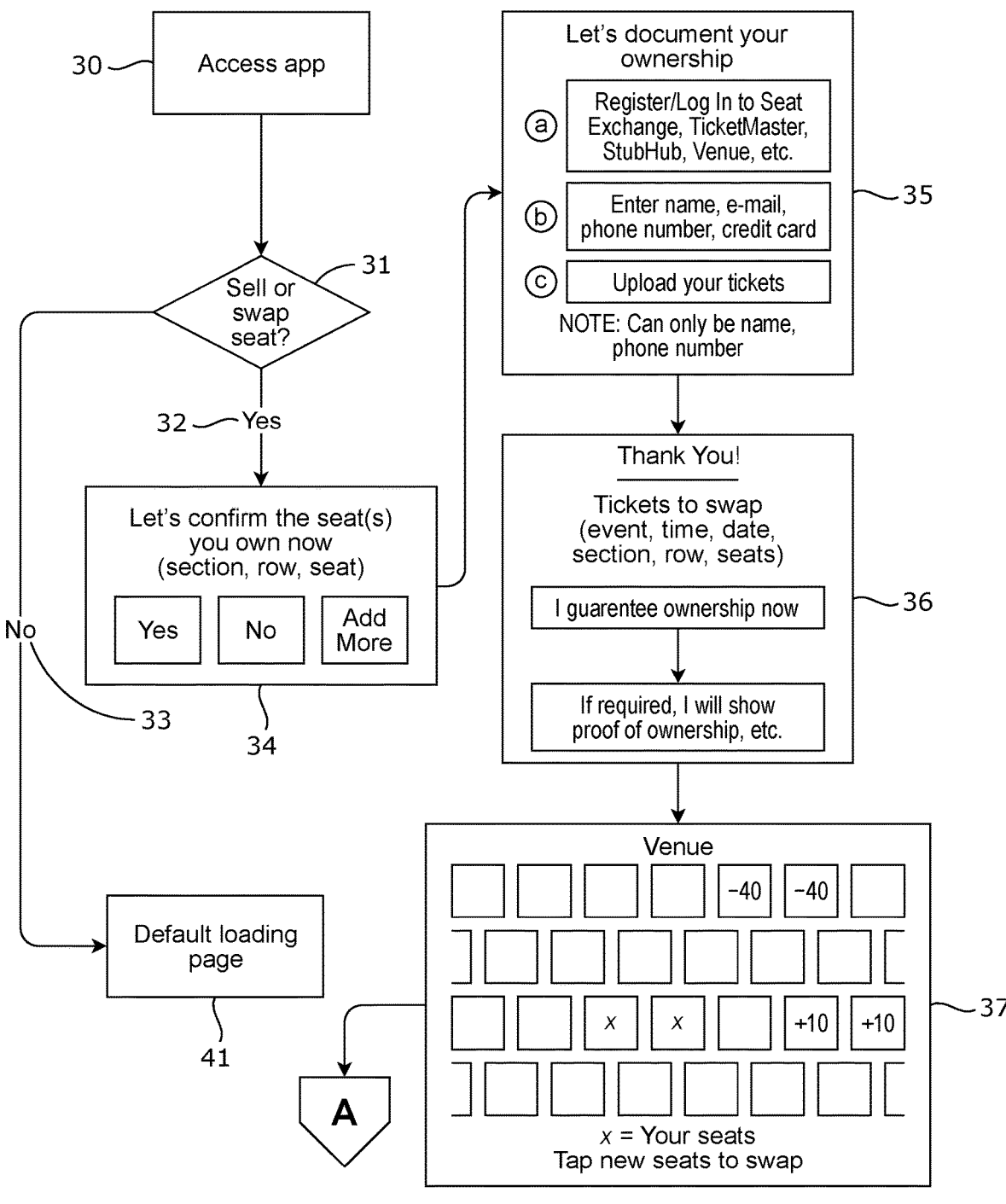
FIGS. 2A and 2B depict a flow diagram showing exemplarily graphical user interface of one embodiment of the system.
Figure 2B:
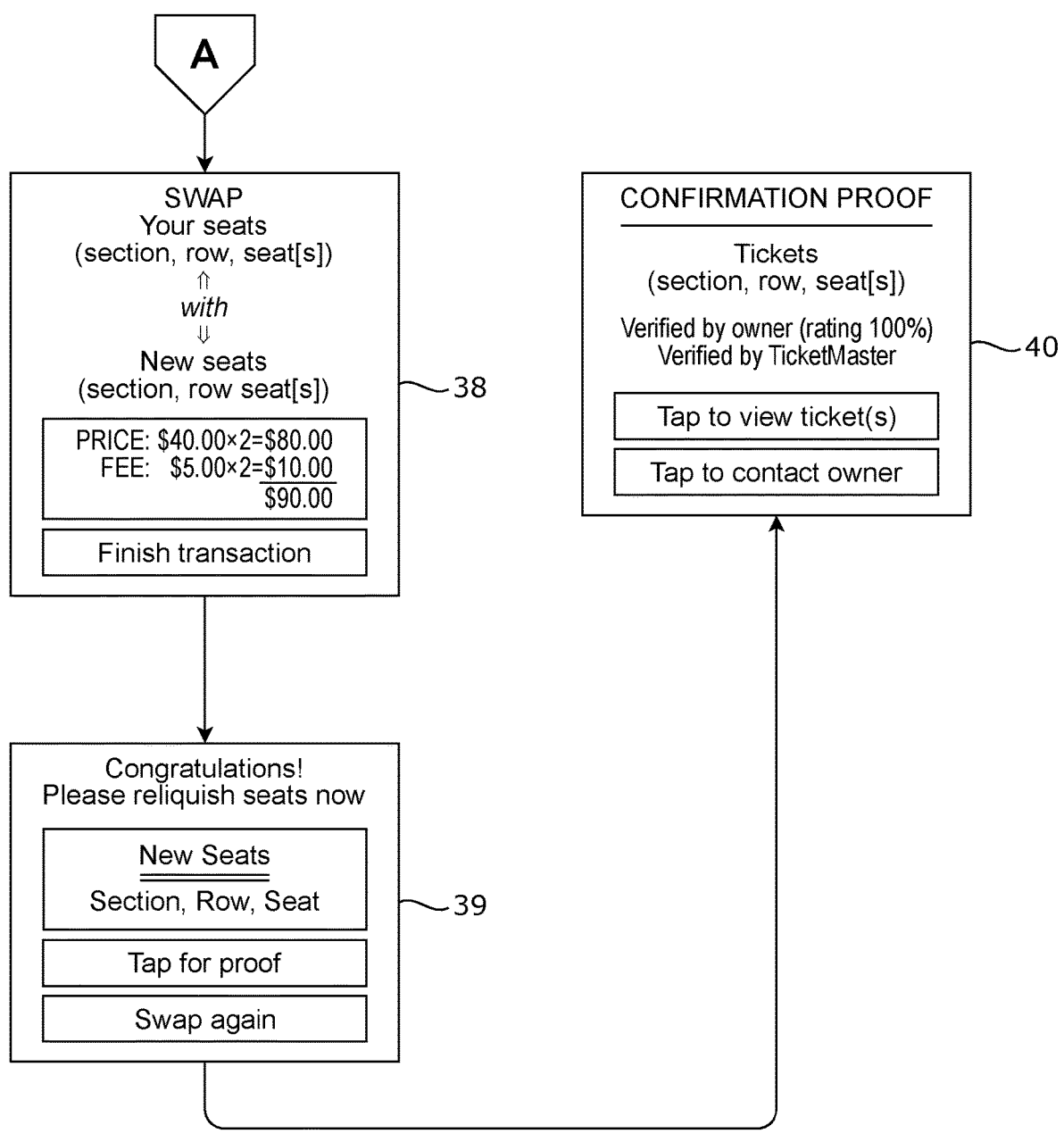

These embodiments are detailed by FIGS. 2A and 2B. A user accesses the system (300) via one of several options. For example, the user accesses the app (30). Upon access to the system, the user receives a prompt to identify that they wish to seek to swap seats (31). If the user selects "no" (33), the App directs the user to a default landing page (41). The swapping of seats can be to get a better seat, swap to be with friends or family, or to make money by swapping from a more expensive seat to a less expensive seat. The user can select a button to "try seat exchange now" or another option from a GUI (218) that is populated on the user device (14a). If the user selects "yes" (32) the App directs the user to a different GUI. By selecting to enter the system the user is asked to confirm seats (34). This allows the user to identify the section, row, and seat, or other identifying aspects of the seat. To promote usage of the App, the system (300) may optionally request minimal information from the user such as the user's seat location and number of seats available for exchange and the present the user with possible deals on exchanges to encourage the user to participate. In this instance, the system (300) can offer an exchange to a user for a price that is lower than the price set by the user listing his ticket for swap. In this instance, the system (or party who reduced the price of the ticket such as the venue or proprietor) makes up the price deficit and pays the full amount of the exchange price to the user who listed the tickets.

The user is then prompted to document/verify the ownership of the seat (35). This is done so that a user cannot just say they are in a given seat and not have the right to actually sit in that seat. The user can register an account and log into the system. This may also include, if the user desires, access to the user's accounts with third-party ticketing agencies, which provided the ticket, but this is not a requirement of the system. A user can enter his/her personally identifiable information, which can be as limited as the user's name and phone number, or may include credit card information, birth dates, middle names, passwords, etc. so as to identify the user. Finally, the user can validate the ticket, such as uploading his/her tickets, this step can also directly provide the seat information when asked to confirm the seat (34). Numerous validation step options are highlighted throughout, but here, the validation step is providing the ticket itself. This may be an image of the ticket, or an image of a readable code that identifies the ticket, or other aspect that allows verification of the ticket, such as the unique ticket ID. In certain embodiments, the image of the ticket becomes part of the chain of title for the seat or ticket. The system stores the image in a database on a server and associates the image with the user profile of each user who has acquired the seat or ticket during the event. The image may remain associated with the user profile for the entire duration of the event or it may be removed at the expiration of the time period for which the user was entitled to occupy the seat or it may be removed when the user exchanges the seat or ticket. Additionally, the system can verify the authenticity of the ticket image, for example by comparing the image to a known ticket, within a database, which can confirm one or more unique features for the given ticket, as a means of preventing fraudulent tickets. Furthermore, the system can also access the ticketing database through API calls and determine if that ticket was validity scanned for entry into the venue. The system accomplishes this by querying various databases containing unique ticket codes via API calls or through AI image recognition. In certain embodiments, the ticket is confirmed by two independent checks before it is marked as authentic and valid in the database. The image of the ticket, its authentication status and chain of title history can be made available for view by all users to consider this information when deciding whether to make a swap or exchange.

At this point, the user has defined the ticket by giving a location, such as a section, row, and seat, and documented the ownership of the ticket. Finally, it may be useful in certain embodiments to guarantee the ownership (36). If you guarantee the ownership, you are then confirming that you will provide any necessary evidence of the ownership. This may be necessary, especially for a digital ticket that cannot otherwise be transferred. Thus, if a user who has acquired the transferred ticket needs proof, the user will guarantee to prove that ownership to fulfill the bargain of swapping seats. After the information is loaded, the system provides for seats that are available for swapping (37). Guarantees may include covering of the price of the exchange or automatically returning the exchanged seat if the other ticket is identified as fraudulent or other agreements between the parties or between the individual and the system.

A selection of a ticket is now made (38). A user offers his/her seats and swap into a new set of seats. The price difference, in this embodiment, is $40 a seat, for a total of $80 dollars and the system has a fee of $5 per ticket, for a total of $10. This yields a total of $90 to be paid. Here, only one person is being charged, as the new tickets are more valuable than the prior tickets. However, both parties to a swap may be required to pay the system fee of $5 per ticket. Thus, in certain embodiments, a $5 fee is paid by each user for $10 total for the transaction to swap a single ticket. The fee that is charged for to the users for exchanging their tickets or seats can be paid to the system, the venue, the ticket provider, the artist, the team, or split among these parties, and once that fee is paid by the user, the exchange has been completed. Using the data within the system of the chain of title of the ticket, each party can be assured of a valid ticket. However, in certain embodiments, new data is appended to the unique ticket code (15) assigned to the ticket thus activating the new ticket code for use of entry into the venue or access to a particular seat. This new data is added into the transaction database (53) of the chain of title for the ticket. Thus, the existing ticket will have a unique ticket code (15) attached to it and also defined within the database and after a trade, the unique ticket code is appended with some additional characters into the transaction database (53). For example, the original ticket code was XYZABC. This code was unique to the venue, the seat, the row, etc. After the trade, the new code, which is then stored in the database, might be XYZABC1. Thus, the original code and ticket are still there for chain of title purposes, and the addition is merely the additional characters appended thereto. Such information can be added to the database, with a timestamp to identify the time of the change, or saved, for example in distributed database systems, such as blockchain.

The users now receive confirmation of the new seats and are asked to relinquish the original seats (39). The tickets corresponding to the new seats are provided to the user with information and proof of the transaction and of the original tickets, if desired (40). A user, after obtaining these new seats, can elect to swap seats again. If proof or chain of title of the ticket is needed, the verification by the prior owner can be recalled from the database and the verification evidence used to confirm the chain of title and validity of the ticket. The user can click within the system to generate a view of the tickets, i.e., if the ticket is needed to access the seat within the venue, as is often the case for large venues. Finally, if needed, the user can contact the prior owner to address any issues.

Figure 3:
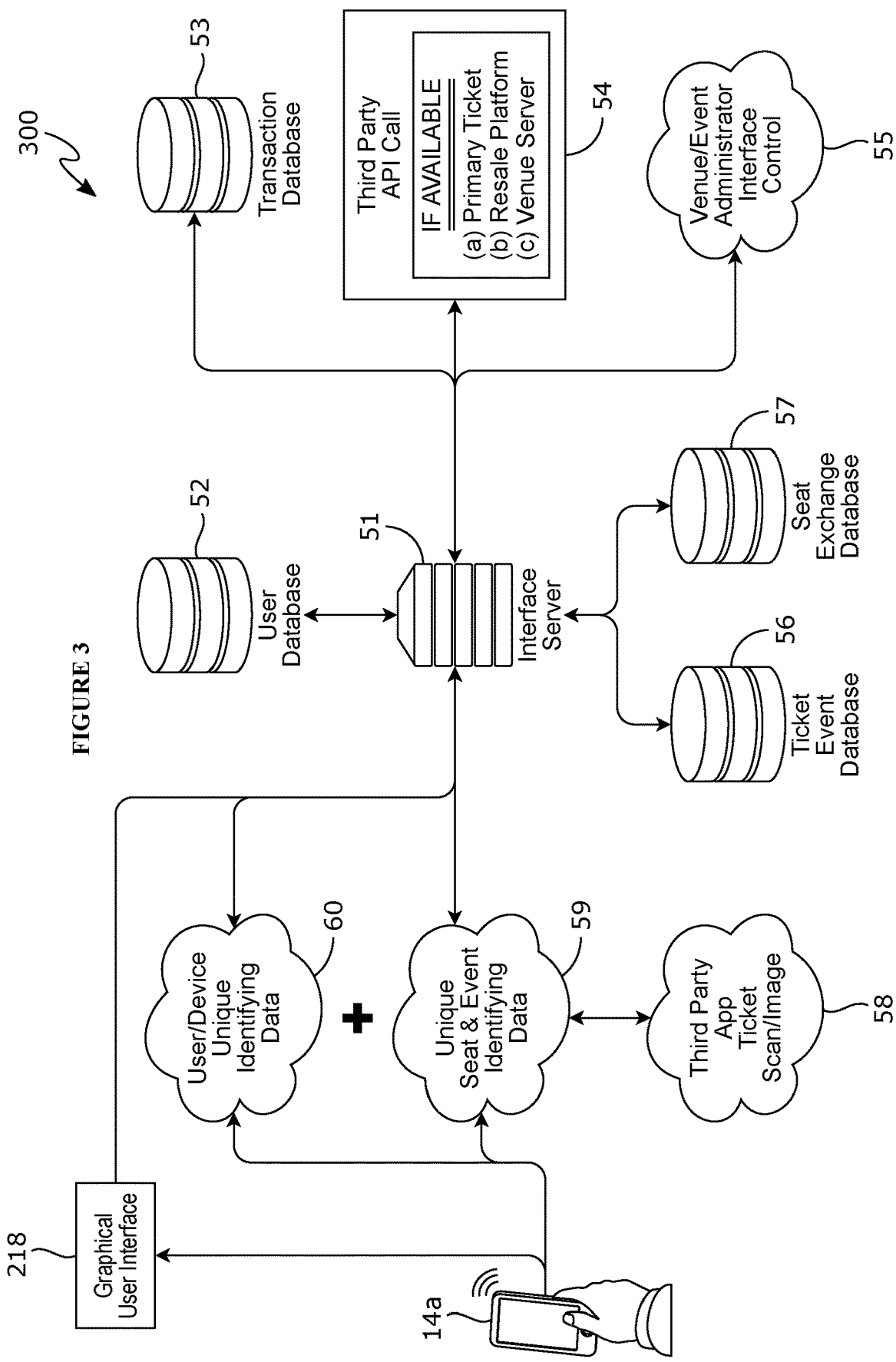
FIG. 3 depicts a block diagram of a high-level system overview.

FIG. 3 details the system from a diagram perspective. The user device (14a) accesses the system (300). Upon entry to the system (300), the user is shown a plurality of modules via a GUI (218) via the interface server (51). The interface server (51) is interconnected to a variety of databases and APIs, for example, the user database (52), the transaction database (53), the seat exchange database (57), the ticket event database (56), all of which may be the same database or separate. There may be a third-party API call (54), if necessary to reach the original provider of the tickets, i.e., the venue, a ticking agency, a resale platform, etc. The unique device ID data (60) which can be a unique code provided and stored on the user device and/or a username and password or any other type of identification assigned to a user or user's device can be accessed. Finally, the unique seat and event data (59) can be accessed by the system (300). The unique seat and event data (59) may further access information from a third-party App or a stored scan or image of a ticket (58) from any of the databases connected to the system. All of these features work together to perform the above method steps, to identify a seat, determine ownership of a seat, verify the seat, swap and pay for new seats, and confirm rights and ownership of the new seats after the swap. Furthermore, the presence of all of the information within the database provides evidence and a transaction history for each ticket that is swapped, so that each user can rely upon the ticket as needed for entry because the verified ticket is stored within the system and can be recalled where needed. The interface server (51) further connects to a venue/event administrator interface control (55) which allows system, event and/or venue administrators to access and control the system.

Figure 4A:
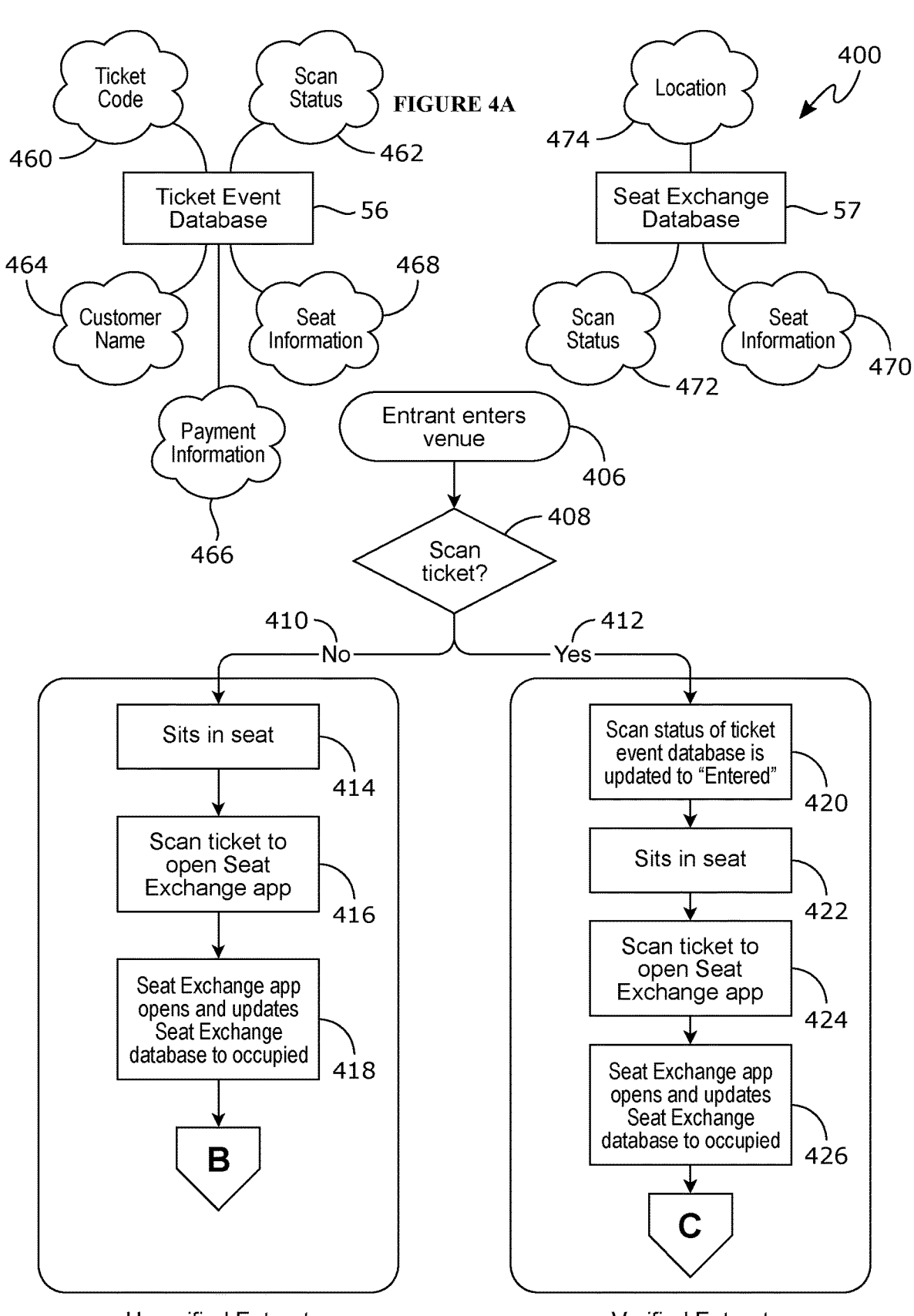
Figure 4B:
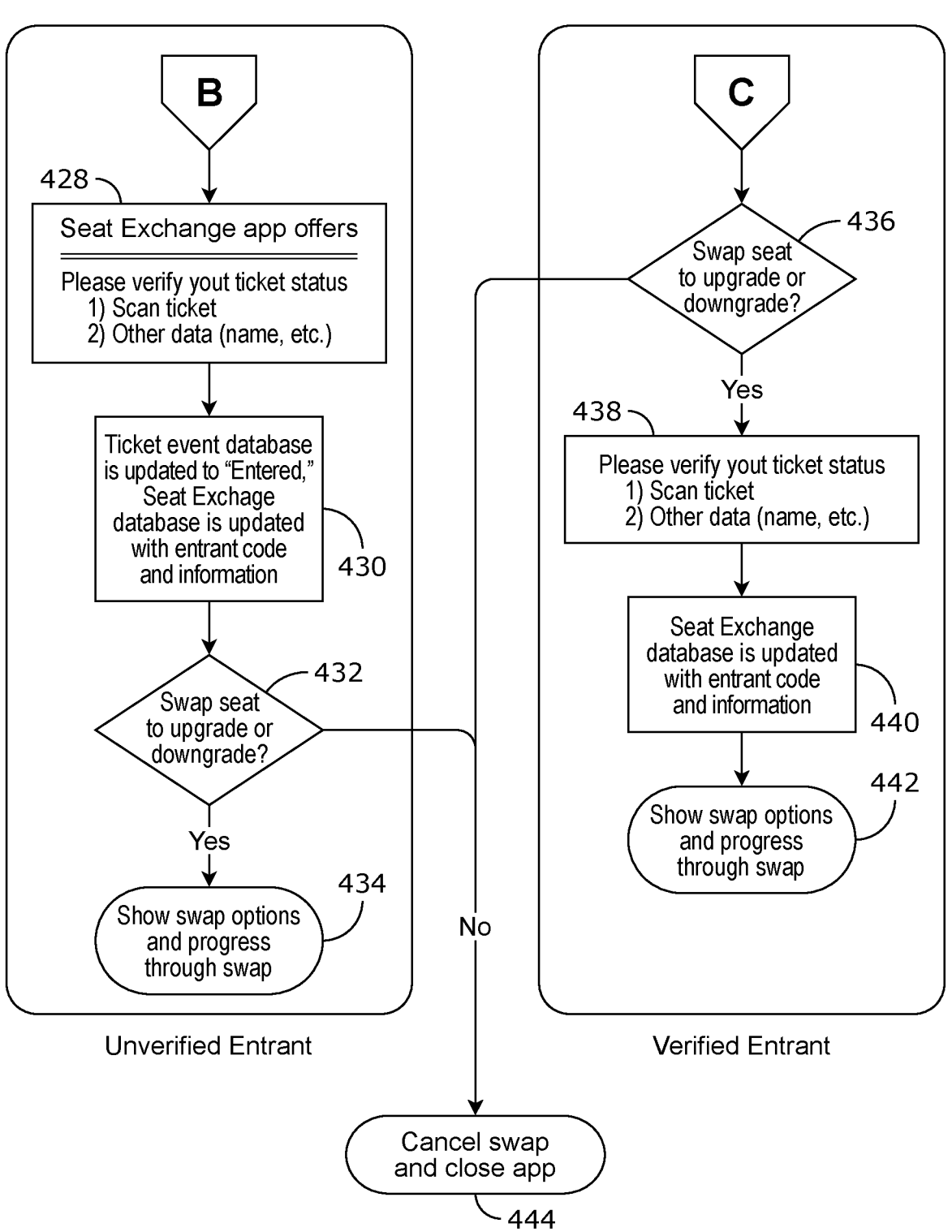

FIGS. 4A, 4B, and 4C provide further details on an embodiment of the system. Turning to FIG. 4A, the system (400) utilizes one or more databases. The ticket event database (56) stores information such as the name of the individual who purchased the ticket (464), the payment method/information (466), seat information (468), ticket code (460), and the scan status of the ticket (462) (i.e., has the user scanned this ticket yet). The seat exchange database (57) stores information such as seat information (470), location of the seat (474) such as latitude and longitude, and scan status (472).

Thus, the user or entrant goes into the venue (406). The venue chooses whether it scans the use's ticket (408). In venues where a scan of the ticket is required, the ticket is scanned (412) and is updated into the ticket event database (56) to confirm scan of the ticket (420). The user then sits in their seat (422). If a swap is desired, the user accesses the seat exchange platform, via the App or Web site (424) for example by scanning the ticket. The user then provides information on the seat, which updates the database (57) with the seat information to allow for transfer of a seat (426). Where a seat swap is desired, "yes" at (436), then the user updates the database (57) with information regarding the occupied seat to being a transfer option. To begin the process of exchanging seats, the user verifies the seat by one of several options (438), such as where the user scans the ticket and provides other data as appropriate and required from FIG. 3. The seat exchange database (404) is updated with the entrant code and information (440). The user is now shown swap options and progresses through the swap (442).

Returning to (436), if the user selects "no" in response to exchanging seats, the system cancels the swap and closes the app (444).

Returning to (408), if the venue does not scan the ticket (410), the user sits in his seat (414) and accesses the system by scanning his ticket or otherwise opening the app (416). The seat exchange App opens and updates the seat exchange database (57) to occupied (418). The App then offers the user several ways to verify his tickets (428) as further detailed throughout this application. The data is updated in the ticket event database (56) to "entered," meaning the ticket has been used and the seat exchange database (57) is updated with the entrant code, the username, or the seat information as necessary (430). Next the App asks the user if he wishes to exchange his seats/tickets (432). If "yes," then the user is provided with seat swapping options and progresses through the process (434). If "no," in response to exchanging seats, the system cancels the swap and closes the app (444).

For the verified entrant, the scanning of the ticket code confirms the validity of the ticket. This information is then made available to the system to determine if a swap is desired. If a swap is desired, the ticket is again verified, by scanning the ticket again, providing name and information, etc. The seat exchange database (57) is updated with this information, which may also be provided from the user's login information, and the user is provided with swap options.

As provided in FIG. 4C, swap options are provided (446) by accessing the seat exchange database (57) for all seats available to swap (448). The swap status for each seat is stored in the database and updated in real time (450). The system sorts the available seat options from the current inventory and presents the user with the best options based on the user's parameters (452). Nonlimited examples of parameters can be upgrading to a better seat, downgrading to a less desirable seat, searching for seats within a particular price range, searching for seats that are held by a user with a certain level rating score. The information for each ticket and swap option is provided and a price, if any, to swap can be calculated based on the value given by each user to their ticket (454) delivered to the user in the GUI. The user confirms the selection (456). The seat selections swap, both parties are informed, the database are updated, and the history kept so that the swap can be reversed if necessary (458). This provides for a backend data supported evidence of the information utilized to verify each ticket, and thus this information can be accessed by the user as needed to use the ticket within the venue.

Some users may use the face value of the ticket, others may use a lower or higher value, depending on their value of the ticket. Alternatively, rather than a user setting the value of his ticket, the value of the ticket or seat to be exchanged is determined through dynamic pricing or defined by a third-party platform which the system accesses via an API call. In this embodiment, the system uses algorithms or other dynamic pricing mechanisms that take into consideration how the value of the ticket can rise or fall as the event unfolds or based on the supply and demand of the participating guests. The system may entice users to exchange or swap their seats by offering them deals delivered through the App or via various other methods of push notification or text messaging. Users may act upon the deals or simply watch them in the App. Furthermore, users are willing to change the initial price cap that they set for exchanging their seats by either increasing or decreasing the price. This change of data point is communicated to the system and which the system uses to recalibrate the algorithm or other dynamic pricing mechanism to deliver more targeted or enhanced deals to the user. The software can provide the best options and offers for a given seat, for example, the ticket with the lowest price, or the ticket with the greatest discount of price from the face value, and thus allows a user to determine how to swap seats based on their criteria. The user then selects from a list. Thus, the system can direct a message to a user, such as "are you interested in seat x," which is an available seat. The user can then follow through the app to exchange those seats.

When selecting a seat, if the seat is not taken, it is essentially being sold, with the user exchanging value for his seat, into the unsold seat. However, when two users are actually swapping seats at the venue, then both parties must confirm and agree to the swap. Just because one user desires a swap does not mean that the user will approve the swap of a proposed seat swap. If the parties agree, the seats are swapped and the information regarding each ticket is transferred as detailed herein. In a preferred embodiment, upon the exchange of seats or tickets, a scannable code is attached to the exchanged ticket so that the exchanged ticket has the same authenticity as the original ticket or can be considered a new ticket. This scannable code can be issued within the original ticketing vendor platform or can be issued within the system independent of the original ticketing vendor platform. Thus, the original ticketing vendor can actually reissue the tickets, with each ticket functioning as a new ticket itself and the original tickets becoming nontenderable.

Figure 5:
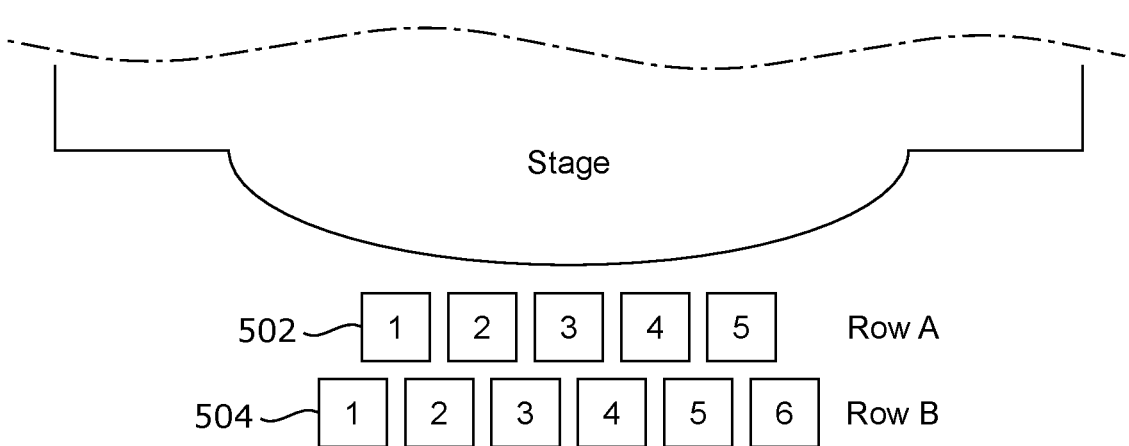
FIG. 5 depicts an exemplary venue with seating.

As shown in FIG. 5, after an attendee exchanges/swaps from their original seat location the seat they can list that now vacant seat for exchange/swap and the whole action moves forward. Turning to FIG. 5, John's seat is B1 (504). There is an open seat in the house at A1 (502). John has B1 (504) and sees A1 (502) is empty and he requests to swap. Before the swap, John is in B1 (504) and A1 (502) is empty and is unsold. After the swap, B1 (504) is empty and John is in A1 (502). B1 (502) is now placed back into inventory for another swap or, to be purchased by someone who is not yet in the venue. This allows further maximization of all seats in the venue. Entrants may offer their seat(s) for a money difference, either positive or negative and choose to upgrade or downgrade. Money can be traditional currency, crypto currency, or in other variations, money may be replaced by a points system and such points can be exchanged for future transactions, tickets to new events, food or merchandise. This points system can also be based on a long term equalization or fairness algorithm. Attendees may offer to just relinquish their seats for free or for money for any number or reasons. All the seats may be electronically priced by a computational program, such as an algorithm, that takes into account, time left in program, excitement, the current market price, the original and current market price of the seats. The venue may offer seats that are not taken or sold for an exchange/swap price based upon these various factors. In some instances, rather than receiving a monetary compensation for the exchange, compensation can be in the form of additional tickets to a future event or credits to such. This is particularly attractive to season ticket holders to sporting or theatre event. A user may hold two season tickets to seats for all games of a particular baseball team. That user may decide to list his two tickets to a particular game for swap/exchange and be compensated with two additional tickets to a future game thus allowing the season ticket holder to bring a party of four to the future game.

EMBODIMENT #3: The system allows the attendee to exchange/swap seats (in any form or way). Each seat can be exchanged/swapped an infinite number of times throughout an event. The history of the exchange/swap for each seat is stored in a record on a database, which could be blockchain, showing each attendee who owned the rights to sit in a seat, the time-based access during which the attendee was entitled to those rights, and any personal information associated with the attendee. At some events, it may be desirable to occupy a seat for a particular period of time. For example, in football and soccer, the teams switch sides and half time. In other sports like lacrosse, the teams switch sides each quarter. It may be desirable for fans to sit on different ends of the field at different times in the game to have a better view of the team for which they are rooting. Other sports, like golf, the players move from hole to hole at different times, and it may be desirable for a user to move to different seats throughout the course to follow a particular player. The system provides a method for renting time-based access to a particular seat or ticket for a limited period of time. In this embodiment, User #1 holds a ticket for a seat on the south half of the field which is his team's scoring endzone for the second half of a game. User #1 desires to obtain a seat on the north half of the field in the first half of the game so that he can be closer to his team's scoring endzone for the first half of the game. Thus, the user desires a time-based access for the first half of the game in one location and a time-based access for the second half of the game in a second location. In this embodiment, User #1 uses the system to list his seat as available for exchange/swap for only the first half of the game. The system notes this in the database stored on a server. User #1 then searches the available inventory in the system and locates a seat that is available in the north half of the field for the first half of the game. That seat is owned and/or occupied by User #2. The system completes the exchange between User #1 and User #2. However, in this instance, the system notes that each user's time-based access to a particular seat is limited to either the first or second half of the game. That information is stored in the user and seat record for that particular event. If the system issues unique codes scannable or detectable by a reader, those codes will only be active on the user's device during the appropriate half for each seat (i.e., during the appropriate time-based access) and expire when the time period expires. The system will warn the user as to when the time that they are entitled to the seat is about to expire and prompt them to vacate the seats immediately. The system can also send alerts to administrators, ushers, security guards, and the like who can assist in removing a user from a particular seat after the time-based access has expired. The history of ownership of the ticket is stored all the way back to the original attendee who verified the ticket/seat. If a copy of the ticket has been uploaded to the system, it becomes a part of this record.

In another variation of this embodiment, time may be determined when a user chooses to leave an event prior to the event's conclusion. For example, a user has scanned his ticket to enter the event and sits in the seat associated with his ticket. However, the user decides at half time that he will be leaving the event and not returning. The user accesses the system via the App and indicates that his seat is available for exchange so that another user already in the venue can obtain the seat via an exchange/upgrade or an outside user who has not yet accessed the venue can purchase the seat and enter the venue for the first time. In this embodiment, there may be an optional layer of security in that user #1 may be required to confirm that he has exited the venue. In one embodiment, the original ticket simply becomes nontenderable and a new ticket comprising a new ticket ID, becomes the valid tender. Thus, if challenged, only one ticket would be valid tender at that point in time. For example, when the user gives up his seat, the system changes the unique ticket ID of the ticket, so that the user's original ticket is no longer valid and issues a new ticket with a new unique ticket ID. The second user would then have a new ticket, with the new unique ticket ID. In certain embodiments, the unique ticket ID simply adds a new character to the original ID, thus providing clear evidence of the transaction history of the ticket. Thus, adding "1" to a first exchange, "12" to a second exchange, or "123" to a third exchange, would give clear evidence of the additional exchanges from the original ticket.

Furthermore, methods to increase security for this type of exchange can be accomplished via geolocation or GPS tracking of user one's device to confirm that he has exited the venue or user #1 may be required to report to customer service location outside of the venue to physically confirm with a system administrator that he has exited the venue, or the venue may use facial recognition technology to confirm that user #1 has exited the venue. In this optional embodiment, it is only once it has been confirmed that user #1 exited the venue that he may list his seat as available for purchase for the remainder of the event. The system now lists user one's seat as available for purchase or exchange for users both within the venue and also users outside of the venue. If a user outside of the venue purchases user one's seat for the remainder of the event, the system delivers a valid ticket code to the purchaser (user #2) which user #2 can use to enter the venue. The system may deliver this ticket within the App or via another mechanism such as e-mail. In another example of this embodiment, the user who exits the event early with no intention of returning may simply relinquish his seat to the system and the system can list the seats as available for exchange/swap without any further action by or money paid to the original ticket holder who relinquished the seat. In this instance, the fee paid for the exchange to the now vacant seat would be paid to the venue, promoter, team, or artist or alternatively can be donated to a charity. In certain embodiments, a credit or points may also be given to the original owner if a sale of the seat is made.

The system also provides a peer rating system for all attendees who participated in the chain of exchange/swap for each seat during the event. At the end of the event, the system asks the attendee to rate each person with whom he interacted which allows the system to create verified "swappers" based upon those peer reviews. Nonlimiting ranking systems include stars or numbers (i.e., five starts with five being the highest ranking and one being the lowest ranking). The peer review system allows attendees to make decisions as to the other attendees with whom they would like to transact exchanges/swaps. The overall ranking for each attendee who participates in the system can by determined by AI, machine learning, or an algorithm. Together with the ranking system, attendees can leave written reviews for one another and/or the venue, event, and system. The peer rating system can be subjective such as the one described above or it can be measurable, objective ratings determined by the system without user input such as latency (i.e., the time it takes a user to respond to another user's request), verification that the user's swapped ticket was successfully used without challenges to the chain of title, or verification that payment was completed without incident. The rating score can be aggregated between the peer review rating system and the system rating system, or the scores can be independent of one another. Additionally, the system has the option to set a minimum threshold score that users must maintain to participate in a ticket exchange or individual venues, promoters, artist and teams have the option to set a minimum threshold score that must be maintained to use the system for a particular event.

The system has the option to connect to other systems via external API calls but is not required to do so. The system can also run independently of the occurrence of an event at a venue (i.e., attendees can exchange/swap seats hours, days, weeks, months, or years before the event actually starts.).

EMBODIMENT #4: The system provides a mechanism for exchanging seating locations even when tickets with unique codes have not been issued or where seats are not assigned a unique identifier (i.e., section, row, seat number). In this nonlimiting example, all attendees enter an event with general admission entry and sit in any seat in the venue. The venue itself, or an administrator or proprietor, is able to withhold a block of seats or a standing room only section that they deem as premium and release that section after attendees have entered the venue but before the event starts or during the event. This can be done through an auction, dynamic pricing, lottery, first to respond, or any other rules and parameters set by the venue. Auctions can be a live auction where users are able to see the highest bid in real time and outbid the current price until the close of the auction or they can be sealed bids that are submitted up to a certain time. In the instance of a sealed bid, the system can assign the best available seat to the highest bidder, the second best seat to the second highest bidder and the nth best seat to the nth highest bidder until all available seats are assigned. The price may also be set by a third-party platform which defines the current market price for the tickets. After this initial exchange/swap released by the venue, attendees who obtained a seat via this embodiment have the option to exchange/swap that seat as described in the embodiments above.

In another nonlimiting example of this embodiment, a venue utilizes general admission seating (i.e., a movie theatre, a local theatre producing a play, etc.). Attendees enter the venue and sit in any seat that they choose. After doing so, the attendee may look around the venue and decide that they want to exchange seats with another attendee for any number of reasons. Currently, the only way that this can be accomplished is for the attendee to approach the person, who may be a stranger, and ask if they would like to swap tickets. If the desired location is on the other side of the venue, this becomes impractical. The system provides a mechanism for attendees to contact each other via their user devices within the system without known contact information for other attendees. In a nonlimiting example, attendees are able to communicate with one another within the system to discuss exchanging/swapping seat with or without a financial transaction between the attendees. While currently, this type of exchange may be desirable, deficiencies in the current technology does not allow it to happen, because of the difficulty, and socially uncomfortable situations of negotiations and exchanging money. The solution of the system removes these barriers. While communication between the users occurs within the system, the exchange of tickets and any associated fees has the option to occur either within or independent of the system. In its most simple form, the system acts as a communication system between two anonymous users who can agree to meet at a certain location in the venue to exchange the tickets for their seats. If there is a fee associated with this manual exchange, the fee can be processed within the system so that no money physically changes hands between the users or the users can exchange funds outside of the system via a cash transaction or via a commercially available cash App such as Venmo®, PayPal® or Zelle®.

The system is also able to operate with or without the participation of the venue and with or without administration by the venue. For example, a football stadium may have a page within the App that is created by and administered by the stadium. The system has the option to allow users to create pages within the App for any venue or event. For example, certain church functions, such as a children's Christmas pageant, may draw capacity attendance to a church making it difficult for families to find seating together. Any user can create an ad hoc event and/or venue page within the App to allow attendees to communicate with one another so that they can exchange seats. In this embodiment any user uses the App to create a record for the event in the system such as "Christmas Pageant, Solid Rock Church, Dallas, Texas, Dec. 24, 2022." The users at the event who wish to participate in the exchange, indicate as such within their App and the system adds that user's profile to the pool of available seats at the event. If the event is in a venue that does not have a defined seating system, users will self-define their seats that are available such as "pew 3 from the front, organ side of church" or "seat next to the Christmas tree." Users will also need to self-define the capacity of seating available such as "room for one adult and two children" or "a full pew."

The system addresses deficiencies in the current state of the art by allowing attendees amenable to exchanging/ swapping seats to know of and to contact or be contacted by other attendees in the venue also amendable to exchanging/ swapping seats, along with any other unsold or unused seat that the venue knows are available seats. The system addresses further deficiencies in the current state of the art by allowing attendees to remain anonymous during the seat exchange transaction via an App based exchange platform such as, but not limited to, a Web browser, Web app, progressive Web app or any other mechanism that allows the user device to communicate with the system. In this embodiment, each user creates a unique user profile that is stored in the system. The user profile may include personal identifiable information such as name, e-mail address, phone number, date of birth, credit card number, that is only viewable to system administrators and not to other users or the user account may be completely anonymous with the user simply creating a username and password. The user profile may also include the user's rating history using the rating system such as the one described in Embodiment #1. The user's rating history and aggregate score may be made visible to all users to verify the trustworthiness of the anonymous user or it may be hidden.

In this embodiment, users indicate to the system that they are interested in exchanging seats with another user in the venue by making the appropriate selection within the App. This is stored in a database of seating for the venue on a server that correlates the seats available with the users who are occupying those seats and/or hold tickets for the particular seat. Via the App, user #1 queries the database to view all available seats listed for sale, exchange or swap. The user is able to view the ratings of each of the users who have also listed their seats as being available for sale, exchange or swap without any visibility into the identity of those users. User #1 is able to use this rating information to make a determination as to whether the other users are trustworthy. User #1 selects the desired seat or ticket with which he wants to exchange/swap and indicates such in the system which marks the request in the database stored on the server. The user who owns or occupies the seat or ticket for this new location is User #2. The system communicates the potential exchange to User #2 via the App or other communication mechanisms such as a chat link, push notification, text message or SMS thus maintaining the anonymity of both User #1 and User #2. In order for the transaction to proceed, the system shows User #2 the final details on the seat he will possess at the end of the exchange and the price of the exchange which can be either a profit or deficit, and User #2 confirms with the system that he would like to proceed with the transaction or rejects the exchange. If accepted, the system then performs the exchange of seats or tickets between User #1 and User #2 via a digital exchange of the first or second ticket or seat and communicates the completion of the transaction to both users. Once the transaction is complete, the users will have the opportunity to rate one another and the rating will be stored in that user's profile. Additionally, the system may rate the users based on non-subjective, measurable metrics such as the latency of the transaction.

In some instances, there may be a fee associated with the exchange of tickets or seats that is paid to one of the users who is party to the transaction or a third party or both. However, if one of the parties to the exchange is a bad actor, it would be advantageous to have those fees held in escrow until a certain period of time to confirm that the exchange of seat or tickets was valid and not voided by the venue because one party did not have ownership of the seat or ticket he listed for exchange. In this instance, the funds exchanged between User #1 and User #2 will be held in escrow pending a confirmatory event. The confirmatory event could be the scan of either the first or second ticket by the venue staff or simply the expiration of a set time period during which either user has the opportunity to lodge a complaint in the system. Once the confirmatory event has occurred, the system will release the funds from escrow and deliver them to the appropriate user or third party.

In a further embodiment, a venue may provide all unsold tickets and all participating users to the system, into an exchange of tickets. Users can set a ticket value, or the value can be determined by an algorithm, as ticket prices may rise and fall depending on the circumstances of the event. Each ticketholder is offered one or more available seats to trade into, which may include an exchange of money. Tickets are immediately available, and so if a ticketholder accepts an exchange, the exchange is instantaneous. After the exchange, the ticketholder's original ticket is now made available for exchange by another. Each of the tickets and their exchange is recorded within the transaction database (53), and, available seats may also be provided within the seat exchange database (57), which allows for this history of ownership to be validated, should it be necessary to prove the same. Thus, tickets will be recorded as to their transactions, and available seats will be populated to show that they are free for purchase or exchange.

EMBODIMENT #5: The system can supplement existing ticketing platforms, or it can replace existing ticketing platforms. The system can also be implemented independent of the master ticket system used for entry into the venue. The proprietor, such as the event organizer, administrator or any third party can run the system without using original ticket system at all, or as a complete replacement for a ticket system, allowing attendees to enter a venue without a charge, or for a nominal charge, and then allow the attendee to sell, exchange or swap seats once inside.

The system allows for the user to identify the individual seat owned by the user, and, based upon this information, the system knows that the attendee is sitting in a particular seat and at a particular time associated with the event. In this nonlimiting embodiment, the system may record the time of access to the system, and for verifying a seat within the system. The system may optionally require the user to create an account with a username and password that can be used to log into the system in order to be the guarantor of the ownership of the seats ticket for that event.

EMBODIMENT #6: The system may be implemented in a venue such as a convention center or conference center for events such as a tradeshow, conference, or seminar. At these types of events, attendees may be given lanyards as their admission ticket to the event. These events typically have speakers, lectures or seminars that may require advance registration with or without assigned seating. Frequently attendees register for one of these breakout sessions as part of a conference but may not be able to attend at the scheduled time or may find a concurrent session that they would prefer to attend. The system provides a mechanism for attendees to contact other attendees, not otherwise known to them, to exchange/swap tickets or reservations for a particular session with or without a financial transaction between the attendees. Likewise, once in the subsection of the venue where the seminar takes place (i.e., lecture hall, theatre, ballroom), the system allows attendees to exchange/swap seat with one another.

EMBODIMENT #7: The system can also be implemented in the hospitality sector such as a hotel or restaurant. In a hotel, guests typically select a room by price point or amenities groupings but within those parameters, the room itself is typically assigned to the guest by the venue. Guests may desire to switch rooms for any number of reasons (i.e., to be on a different floor, to have a different view, to be closer or further from amenities such as the hotel pool, restaurant, or lounge. The system allows guests to list their room for exchange/swap, with or without a monetary exchange between the guests. Likewise, many restaurants require reservations for a particular time slot. The system allows guests who have made a reservation at a restaurant to list that reservation for exchange/swap with or without a monetary exchange between the guests.

EMBODIMENT #8: In another embodiment, the exchange/swap can be a giveaway by the event or venue. For example, attendees can enter into a drawing to be selected to upgrade from their current seat to a premium seat. This may optionally require the attending to provide unique identifying information or demographics that are valuable to the venue, event or other marketers or advertisers.

Figure 6A:
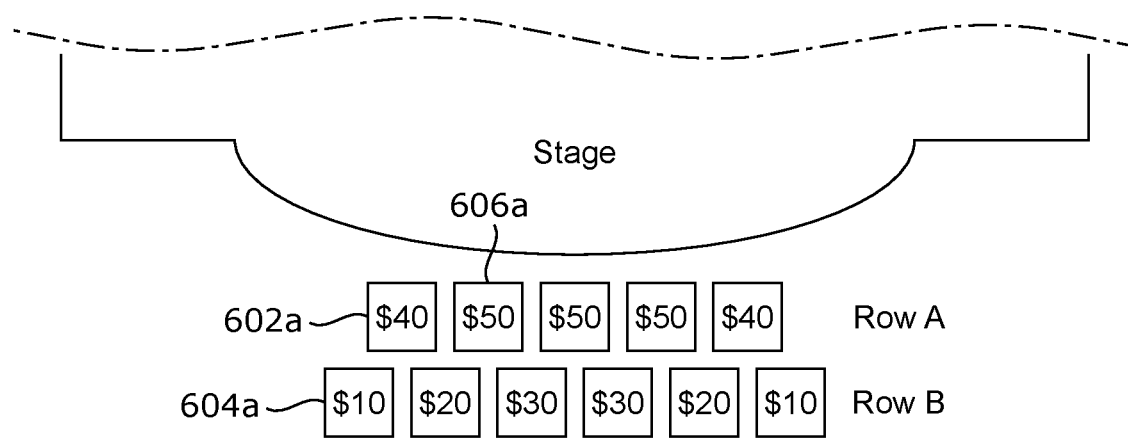
FIGS. 6A and 6B depict an exemplary venue utilizing dynamic pricing.
Figure 6B:
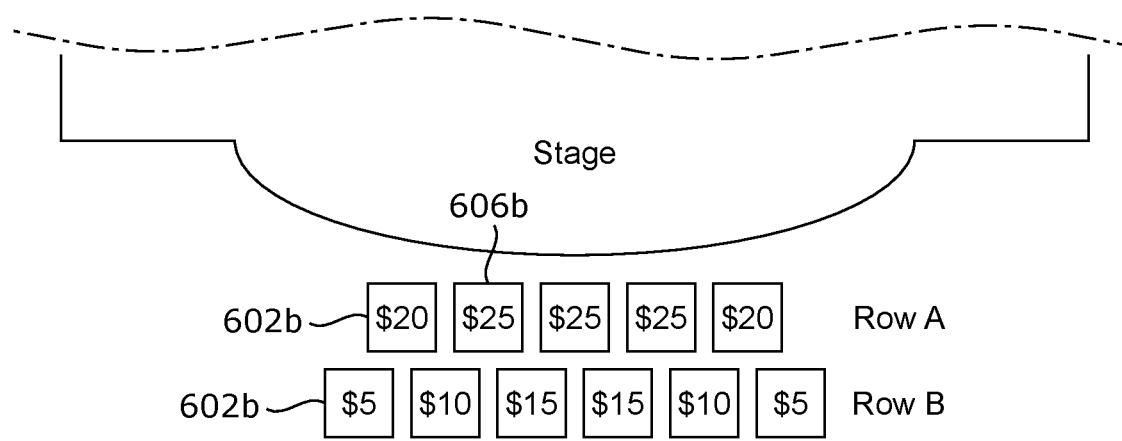

EMBODIMENT #9: In another embodiment, the fee for the exchange/swap in a venue (or conference center, hotel, or restaurant) may be determined dynamically. As shown in FIG. 6A and FIG. 6B, the event or venue offers a seat(s) that is currently unsold to all attendees. The pricing for that seat changes dynamically over time utilizing an algorithm, AI, or machine learning. Here, the seats in FIG. 6A are provided at 50% off of face value 15 minutes before the event, and FIG. 6B details certain seats at 25% off price at the time of the event. Turning to FIG. 6A, the original price for seat A1 (602a) is $40, the original price for seat A2 (606a) is $50 and the original price for seat B1 (604a) is $10. The system knows the scheduled starting time of the event and reduces the price of the tickets by 50% fifteen minutes prior to the starting time so, as shown in FIG. 6B the new price for seat A1 (602b) is $20, the new price for seat A2 (606b) is $25 and the new price for seat B1 (604b) is $10.

In an example, the system may optionally pay a commission paid on each transaction. For example, user Bill has seat

A1 (602a). He sees the option to swap A1 (602a) for A2 (606a). Bill's ticket (602a) has a value of $40 and seat A2 (606a) has a value of $50 so the system calculates the price difference of $10. However, the system charges a commission fee of $2 so the total cost for Bill to exchange his search from A1 (602a) to A2 (606a) is $12. John is currently sitting in seat B1 (604a) and sees that after Bill's swap is complete, seat A1 (602a) is now vacant. John's ticket (604a) has a value of $10 and seat A1 (602a) has a value of $40 so the system calculates the price difference of $30 plus the $2*commission fee so John is charged $32 for the exchange. The commission can be paid to the system, the venue, the event, the artist, the team, the original ticket holder, or any other party or combination of parties.

Figure 7:
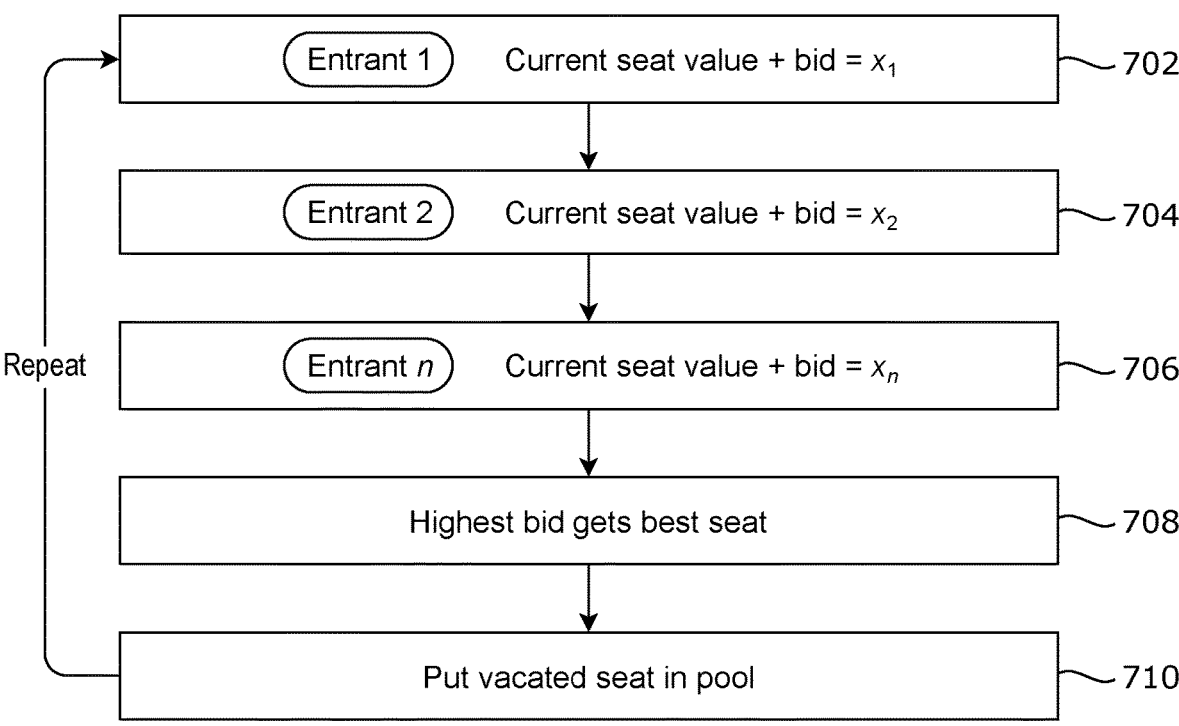
FIG. 7 is a flowchart of an embodiment of the system for a venue wide exchange/swap.

EMBODIMENT #10: In another nonlimiting embodiment, the venue may designate a certain time during which a venue-wide exchange/swap can occur. As shown in FIG. 7, the venue wants to have one big SWAP fifteen minutes before the event starts. Each seat will be prepriced by the venue for the swap, with all unsold available good seats now added to the SWAP. Each seat holder may bid for an upgrade or make an exchange at a set price. The venue, proprietor or administrator can optionally communicate that the venue-wide swap is open by posting it as a unique offer (214) on the jumbo screen (204 from FIG. 1). The jumbotron (204) may optionally display a countdown timer (216) showing the time remaining before the option to exchange/swap seats closes and new assignments are distributed. This type of unique offer can be displayed on any type of digital or electronic screen within the venue and is not limited to a jumbotron.

An auction formation can also be provided, wherein the best, unsold seat is made available at auction. All users can bid on these unsold seats. When the auction ends, or a threshold price is met, the auction is awarded to that user. The user's prior seat is then vacated and put into the pool for the next best auction seat. In some instances, the user's prior seat may then be the next best available seat to be auctioned. A nonlimiting example of the formula to be used is shown in FIG. 7. Entrant 1 places his bid by adding his bid to the current seat value on which he is bidding (702). Entrant 2 places his bid by adding his bid to the current seat value on which he is bidding (704). Entrant 3 places his bid by adding his bid to the current seat value on which he is bidding (706). The system determines the highest bidder and awards that entrant the seat (708). The seat that the winning bidder relinquishes is put in the vacated seat pool (710).

In a further example of this embodiment, an auction is utilized to redistribute both unsold seats and seats that users wish to exchange. In this instance, both unsold seats and seats which users wish to exchange are marked as available for swap in a database stored on a server that can be accessed by the system. The user relinquishes his seats by indicating as such in the App and also selecting whether the desire to upgrade their seats (move to a better, more desirable location) or downgrade their seats (move to a less desirable location) as well as the price the user is willing to pay for the new seats. These auctions can occur at one or multiple times during the event as designated by the venue, artist, team, promotor, or system administrator. For example, at a Broadway play, it may be designated that this type of auction can occur ten minutes before the start of the play and again at intermission.

EMBODIMENT #11: In another nonlimiting example, previously sold seats that are not in use (i.e., the ticket holder is no longer able to attend the event and was not able to resell the ticket prior to the start of the event) can be made available for exchange/swap by using a third-party API to identify these seats. This addresses a deficiency in the current state of the art as currently, ticket sales are locked and do not occur after a set time prior to or after the start of the event. The system provides a frictionless method for the continuous sale of tickets at any time prior to the conclusion of the event. For example, Mary owns A1 and A2, and has listed on a third-party ticket exchange platform. Mary's seats remain unsold before or after the start of the game. The system makes an API call to the third-party ticket exchange platform to show availability of Mary's seats. John is in B1 and B2 and wants to upgrade seats. John accesses the system and A1 and A2 are shown as an upgrade. John pays the difference in the seat price and Mary is given the difference in the seat price of A1 and A2 to B1 and B2. Mary now owns B1 and B2, and these seats remain listed and available for purchase or further trade. Sam, who does not own tickets, now buys B1 and B2 (originally owned by John), and Mary receives the purchase price of the sale of B1 and B2. These seats, though on the third party ticket exchange platform system, are collected and can be sold through the digital seat platform through the API. The third-party ticket exchange platform receives its portion of the fee, Mary receives her portion, Sam gets his seats, and the system may optionally receive a commission on both trades/sales.

In another embodiment, a user desires to relinquish their seat before the end of the performance or game at the given venue. The user can make their seats available within the system, and a second user can then trade into those seats or buy those seats. This can be performed by making the seats available on the system, and validating the ticket, in one of the several mechanisms as detailed herein. A further embodiment may utilize a scan of a ticket corresponding to the user, wherein ushers, or personnel at the venue having a scanning device to scan a ticket. Scanning of the ticket, through the system, allows for the ticket to immediately be uploaded into the system as available. A second user, desiring the now vacated seats, can now buy the ticket or exchange for the ticket through the venue or through the user, for a fee.

One factor that is present in all embodiments is the presence of a server and a database for the system, which allows for each user to identify a seat, store information related to that seat, namely a ticket, or other authenticating document, and then, after an exchange, all ticketing information remains within the system. This provides supporting evidence for each ticket that is provided for and exchanged within the system, so that the user always has the evidence to support their right in and to a venue or to a seat afforded by that given ticket.

Thus, returning to FIG. 3, a user within the system would access the system, through the interface server (51). The user would validate a ticket, which has some unique data (59) which is provided by the user, via the user device, or via a third party API or a third-party App. The unique data (59) is sent to the transaction database (53), which may interact with the user device, a unique device ID (60), or a third-party API call (54), to then validate that ticket, as being legitimate with the user's information. Where only a first user is interested in exchanging a ticket for an unsold ticket, the seat exchange database (57) with the event database (56), which may be different or the same, interact to populate available seats, and an exchange is made. The original ticket, now being put back into the available database, and the user has a new ticket, and the transaction is recorded within the transaction database (53), via the interface server (51), to evidence the transaction.

If two users are exchanging seats, then the second user must also validate their seat and ticket. After both seats are validated, the interface server can calculate a difference in price, if any, and upon payment, make the exchange. This information would then be evidenced in the transaction database (53), as above.

Preferably, when seats are exchange or replaced, the unique seat ID (59), which was provided in the transaction database (53), is further appended with a new code, which may be as simple as a single additional alphanumeric character, to signify that the ticket is a "replacement" or "exchange" and thus can be validly scanned or used by a new user, and which makes the original ticket null and void. Such information is appended during the transaction database and may also be provided within the seat exchange database (57), as needed by the venue. Furthermore, this information may also be modified within the original ticketing database controlled by the venue or ticket provider.

While many of the embodiments described herein have been described as a single user exchanging a single seat with another user, it should be understood that the embodiments can also be used for the exchange of sets of seats in the same manner. For example, a family of four with consecutive seats in a certain section and row can exchange their seats for another block of four seats in the venue. Just one of the ticket holders in the block to be exchanged can act on behalf of all of the ticketholders in his block rather than each user making an individual swap. In this nonlimiting example, one parent may log on and complete the exchange/swap for all for members of his group.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:

1. A system for tracking ticket ownership for an event at a venue comprising:

a. at least one server comprising a processor and a memory, and a database operatively coupled to the at least one server wherein for each ticket issued for an event the database stores:

i. ticket ownership information;

ii. a unique code that is indicative of a particular seat within a venue and is indicative of a ticket chain of title position, wherein the unique code is encoded on the ticket as a machine readable code to be read by a reading/scanning device; and iii. a scan-status entry that indicates whether the ticket has been scanned to enter the venue;

b. in response to the server receiving an indicator from a venue-based reader/scanner that a first unique code on a first ticket has been scanned, updating the scan-status entry for the first ticket to indicate that first ticket has been validly scanned to enter the event;

c. in response to the server receiving a scan from a first user device of the first unique code automatically determining whether the scan-status entry for the first ticket indicates that the first ticket has been validly scanned to enter the event, and if so, enabling an image of the first ticket to be uploaded from the first user device to the database;

d. in response to the server receiving the image of the first ticket from the first user device, the at least one server validating ownership of the first ticket by comparing the image of the first ticket to a corresponding known ticket in the database to determine if the image of the first ticket includes a unique feature utilized to prevent fraudulent tickets, and if the determination is positive, storing the validation and the image of the first ticket therewith and enabling the system to identify the first ticket as available for exchange, and if negative, preventing the first ticket from being exchanged;

e. the at least one server querying the database and identifying a second ticket issued for the event that is also available for exchange, the second ticket having been scanned by the venue-based reader/scanner and determined by the server to be nonfraudulent;

f. in response to receiving a selection of the second ticket via the first user device, the at least one server executing an exchange of the first ticket for the second ticket, wherein for each of the first ticket and the second ticket the at least one server causes the database to retain original ticket ownership information, validation information, and the image of the first ticket in association together, update exchanged ticket ownership information, and modify the first unique code by appending thereto a character indicative of a second iteration of the first ticket; and g. in response to the server receiving a scan of the modified first unique code from a second user device, the server performing a database lookup of the validation information from the first user device to certify chain of ticket title to the second user device.

2. The system of claim 1 wherein the server transmits an image of the second ticket to the first user device in response to the exchange of the first ticket for the second ticket and wherein the image of the second ticket includes a modified second unique code indicative of a second iteration of the second ticket which, when scanned by the first user device, causes the server to retrieve a ownership history associated with the second ticket.

3. The system of claim 1 wherein the server receives a payment to offset a difference in value between the first ticket and the second ticket.

4. The system of claim 1 wherein appending a new character to the first unique code and/or a second unique code comprises adding at least one additional alphanumeric character to the first unique code and the second unique code together with a timestamp corresponding to the time of a change in ticket ownership.

5. The system of claim 1 wherein the first ticket defines a geolocation and before the exchange the server verifies the first ticket in response to receiving an indicator that the first user device matches the geolocation for the first ticket.

6. The system of claim 1 wherein the system dynamically prices the first ticket, the second ticket, or both in response to time left in the event, excitement provided by the event, a current market price of the ticket, an original and a current market price of the respective particular seats, or combinations thereof.

7. The system of claim 1 further comprising a machine-readable code provided by the venue, the machine-readable code encoding seat data indicative of a particular seat within the venue, and in response to receiving seat data from the machine-readable code provided by the venue from the first user device, using the seat data to confirm that the seat identified by the first unique code and the seat data are a same seat.

8. The system of claim 1 wherein the server confirms the exchange in response to receiving a scan of the second ticket from the first user device after the exchange.

9. The system of claim 8 wherein the server holds a payment in escrow and upon receiving the scan of the second ticket from the first user device the server confirms completion of the exchange, which triggers release of the payment from escrow.

10. A system for tracking a chain of title for a first ticket and a second ticket that are exchanged, the first ticket and the second ticket for a same event taking place at a same venue, comprising:

a. a server comprising a processor and memory, said server for executing instructions that enable tracking ticket chain of title and ticket exchange;

b. at least one database operatively coupled to the server wherein for each of the first ticket and the second ticket the database stores:

i. ticket chain of title information;

ii. a unique code indicative of ticket iteration and a particular seat within the venue, wherein the unique code is encoded on the ticket as a machine-readable code; and iii. a scan-status entry that indicates whether the ticket has been validly scanned to enter the venue;

c. in response to the server receiving an indicator from a venue-based scanner that a first unique code corresponding to an original first ticket and a second unique code corresponding to an original second ticket have each been scanned, the server causing the scan-status entry for each of the original first ticket and the original second ticket to be updated to reflect use for valid entry into the venue;

d. wherein in response to a first user device accessing the system, the server receives verification information, validation information, or both, and if verified and/or valid, the server enables an offer to exchange the original first ticket for the original second ticket, the original second ticket having been previously verified, validated, or both wherein verification information and/or validation information includes global positioning system (GPS) coordinates from the first user device that the server has determined to be within a predefined geolocation corresponding to at least the venue;

e. wherein the server receives a confirmation from the first user device and a second user device that the exchange of the original first ticket for the original second ticket has taken place and in response thereto updates the database with a modified first unique code corresponding to an exchanged first ticket and a modified second unique code corresponding to an exchanged second ticket wherein each modified unique code identifies the respective ticket as a second, subsequent ticket in the chain of ticket ownership events by the server automatically appending a character to the first unique code and the second unique code, the character indicating that each of the first ticket and second ticket are second iterations of the respective ticket and storing each of the unique first code and modified unique codes and unique second code and modified second unique codes in the database;

f. wherein the server transmits a copy of the first ticket having the modified first unique code to the second user device and a copy of the second ticket having the modified second unique code to the second user device; and g. in response to the second user device scanning the modified first unique code, the server transmitting current chain of title evidence to the second user device.

11. The system of claim 10 wherein confirming ownership of the exchanged first ticket includes determining an owner based on a time of exchange, a user associated with the modified first unique code, or both.

12. A method performed by a computer for validating a chain of title for a ticket issued for an event at a venue comprising:

a. issuing a unique ticket identifier to identify the ticket, the venue, a particular seat within the venue, and a number of times ownership of the ticket has changed and storing the unique ticket identifier in a database wherein when the unique ticket identifier is validly scanned by a venue-based reader, the computer updates a scan status database entry corresponding to the ticket as being validly scanned;

b. upon determining that the ticket has been validly scanned for entry, receiving ownership data that establishes ownership of the ticket, a seat associated with the ticket, or both, from a first user device and storing the ownership data in the database in association with the unique ticket identifier;

c. using the ownership data, the unique ticket identifier, additional user information, or combinations thereof to validate ownership of the ticket and storing the validation in association with the unique ticket identifier, additional user information, or both;

d. receiving a request from a second user device to obtain ownership of the ticket;

e. in response to receiving approval of the request to obtain ownership of the ticket from the first user device, modifying the unique ticket identifier by appending an element to the unique ticket identifier, the appended element indicative of the number of times there has been a change in the chain of title of the ticket; and f. storing the unique ticket identifier, the ownership data, the validation, the modified ticket identifier, and any subsequent ownership data in the database to enable on-demand validation the chain of title of the ticket by the first user device, the second user device, or both wherein upon receiving a scan of the modified ticket identifier from the second user device corresponding to a request for on-demand validation, the modified ticket identifier is used to retrieve a complete chain of title history of the ticket and transmitting the complete chain of title history to the second user device.

13. The method of claim 12 wherein receiving ownership data comprises receiving an image of the ticket from the first user device and storing the image of the ticket to enable on-demand validation of the chain of title of the ticket.

14. The method of claim 12 further comprising adding a time stamp to the database, the time stamp indicative of the time when the chain of title changed.

15. The method of claim 12 wherein receiving approval of the request to obtain ownership of the ticket comprises receiving an approval for a limited time during the event and in response to expiration of the limited time changing the modified unique ticket identifier by appending an additional element to the modified unique ticket identifier, the additional appended element indicative of another change in the chain of title of the ticket, and storing the changed modified ticket identifier in the database in association with the unique ticket identifier, the ownership data, the validation, the modified ticket identifier, and the subsequent ownership data in the database to enable on-demand validation the chain of title of the ticket by the first user device, the second user device, or both.

16. The method of claim 12 further comprising storing a rating indicator in association with user information in the database, the rating indicator indicative of user reliability of previously performed transfer of ticket title at prior events.

17. The method of claim 12 further comprising receiving a request from the second user device for on-demand validation of the ticket and in response thereto transmitting one or more of the unique ticket identifier, the modified unique ticket identifier, the validation, the approval of the request, and subsequent ticket ownership information to the second user device.

* * * * *